(12) United States Patent
Yu et al.

(10) Patent No.: US 9,137,725 B2
(45) Date of Patent: Sep. 15, 2015

(54) APPARATUS AND METHOD FOR DISPERSING USERS IN WIRELESS COMMUNICATION SYSTEM

(71) Applicant: Samsung Electronics Co., Ltd., Gyeonggi-do (KR)

(72) Inventors: Yong-Ju Yu, Seoul (KR); Kyoung-Il Min, Seoul (KR)

(73) Assignee: Samsung Electronics Co., Ltd (KE)

( * ) Notice: Subject to any disclaimer, the term of this patent is extended or adjusted under 35 U.S.C. 154(b) by 187 days.

(21) Appl. No.: 13/782,464

(22) Filed: Mar. 1, 2013

(65) Prior Publication Data

US 2013/0281088 A1  Oct. 24, 2013

(30) Foreign Application Priority Data

Apr. 19, 2012  (KR) .......................... 10-2012-0040754

(51) Int. Cl.
| | |
|---|---|
| *H04W 4/00* | (2009.01) |
| *H04W 36/22* | (2009.01) |
| *H04W 4/02* | (2009.01) |
| *G06Q 30/00* | (2012.01) |
| *H04W 36/36* | (2009.01) |

(52) U.S. Cl.
CPC .............. *H04W 36/22* (2013.01); *G06Q 30/00* (2013.01); *H04W 4/021* (2013.01); *H04W 36/365* (2013.01)

(58) Field of Classification Search
USPC ........ 455/434, 422.1, 414.1, 414.3, 446, 448, 455/423, 456.2, 566, 575.1, 450, 453, 436; 345/440, 660, 156; 370/328, 235, 312; 705/14.45; 709/220, 225
See application file for complete search history.

(56) References Cited

U.S. PATENT DOCUMENTS

| | | | | |
|---|---|---|---|---|
| 6,321,083 | B1 * | 11/2001 | Vaara et al. .................... | 455/446 |
| 6,327,472 | B1 * | 12/2001 | Westroos et al. .............. | 455/450 |
| 2006/0200540 | A1 * | 9/2006 | Morishima et al. ........... | 709/220 |
| 2008/0106513 | A1 * | 5/2008 | Morotomi et al. ............. | 345/156 |
| 2009/0085934 | A1 * | 4/2009 | Baier et al. ..................... | 345/660 |
| 2010/0103868 | A1 * | 4/2010 | Meng et al. .................... | 370/328 |

FOREIGN PATENT DOCUMENTS

KR  1020110114390  10/2011

* cited by examiner

*Primary Examiner* — Charles Appiah
*Assistant Examiner* — Alexander Yi
(74) *Attorney, Agent, or Firm* — The Farrell Law Firm, P.C.

(57) ABSTRACT

A method for user distribution in a wireless communication system is provided by generating a screen for showing information regarding a lower-traffic region and displaying the screen by using a display element, wherein the generated screen includes at least one of an advertisement of a shop in the lower-traffic region, an indicator for indicating a per-cell traffic usage amount corresponding to a usage level, and a notice for recommending a medium change.

22 Claims, 17 Drawing Sheets

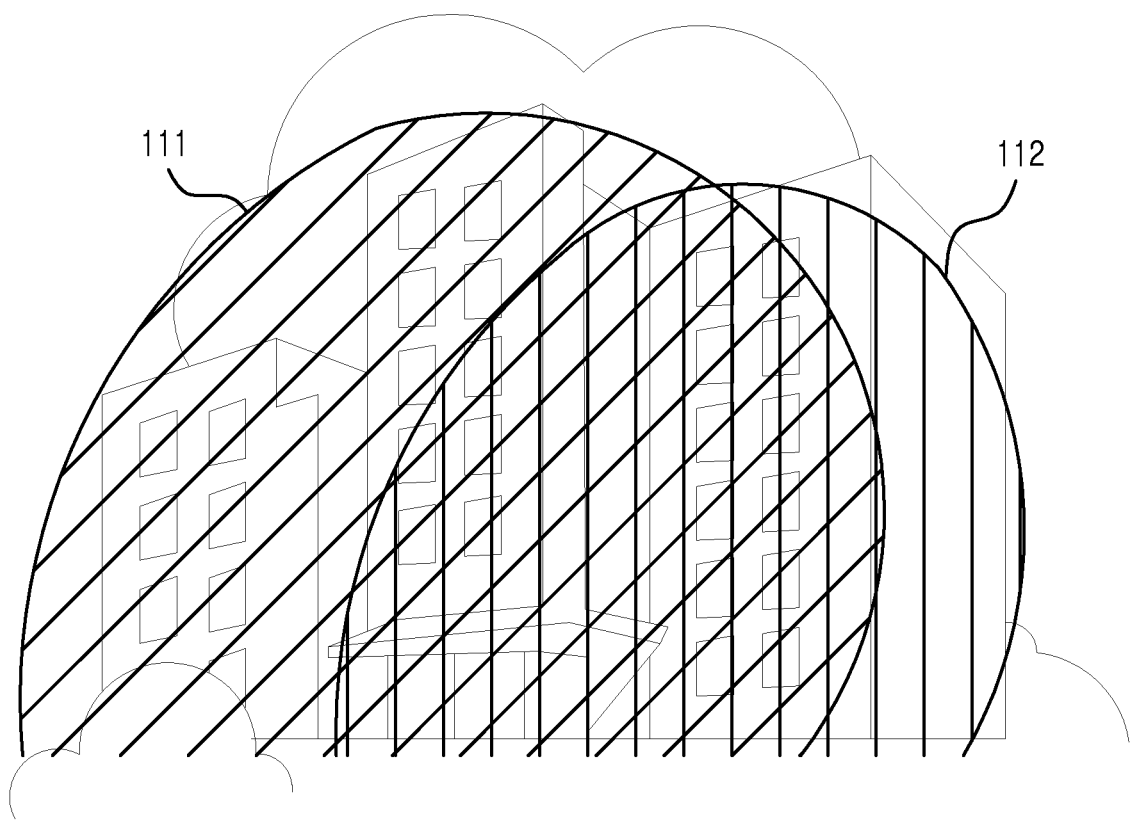
 : LESS-TRAFFIC REGION
 : HIGH-TRAFFIC REGION
FIG.1A

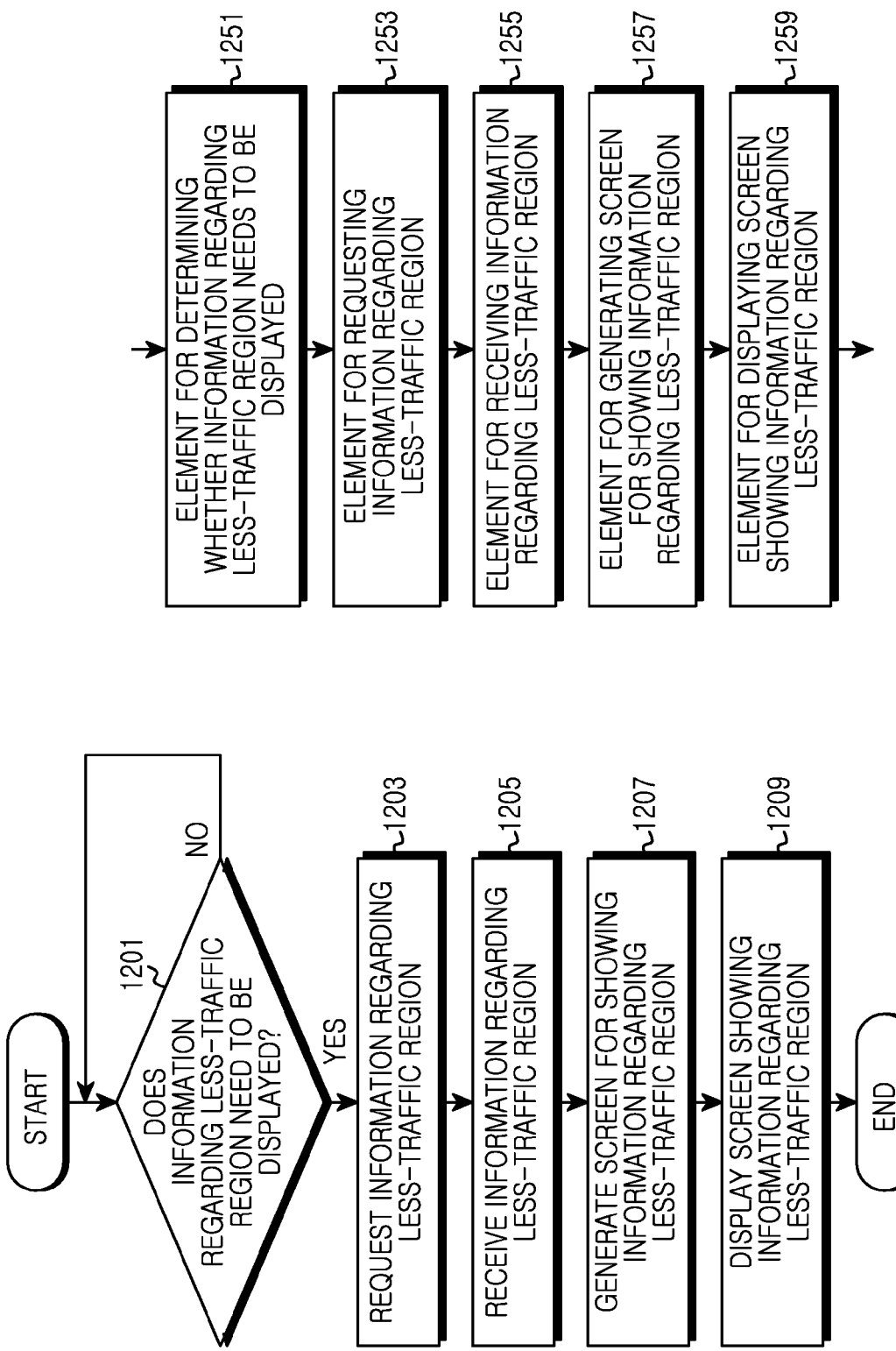

APPARATUS AND METHOD FOR DISPERSING USERS IN WIRELESS COMMUNICATION SYSTEM

PRIORITY

This application claims priority under 35 U.S.C. §119(a) to a Korean patent application filed in the Korean Intellectual Property Office on Apr. 19, 2012 and assigned Serial No. 10-2012-0040754, the entire disclosure of which is incorporated herein by reference.

BACKGROUND OF THE INVENTION

1. Field of the Invention

The present invention relates generally to a wireless communication system.

2. Description of the Related Art

At present, most commercialized wireless communication systems provide a wireless access service based on a cell configuration. That is, the system includes a plurality of base stations, each of which physically forms a coverage area within a specific range, corresponding to a cell. Accordingly, an electronic device performs communication by selecting an optimal cell in accordance with a user's movement, and occasionally performs a handover for changing a serving cell.

In cases when multiple users are concentrated in a specific cell, since the traffic amount which can be handled by one base station is limited, resources cannot be sufficiently allocated to all users. In addition, since a relatively smaller number of users exist in neighboring cells, surplus resources may be present in the neighboring cells. That is, a traffic overload is present in the specific cell and a surplus resource is present in the neighboring cell, which results in deterioration of overall system efficiency. Therefore, there is a need for a method for preventing the users from excessively being concentrated in the specific cell.

SUMMARY OF THE INVENTION

Accordingly, an aspect of the present invention is to solve at least the above-mentioned problems and/or disadvantages occurring in the prior art, and to provide at least the advantages described below. Accordingly, an aspect of the present invention is to provide an apparatus and method for preventing users from being concentrated in a specific cell in a wireless communication system.

Another aspect of the present invention is to provide an apparatus and method for guiding users to lower-traffic cells in a wireless communication system.

Another aspect of the present invention is to provide an apparatus and method for reporting a traffic status of cells to users in a wireless communication system.

Another aspect of the present invention is to provide an apparatus and method for inducing user distribution without a user's recognition in a wireless communication system.

In accordance with an aspect of the present invention, a method for operating a terminal in a wireless communication system is provided. The method includes generating a screen for showing information regarding a lower-traffic region, and displaying the screen by using a display element, wherein the screen comprises at least one of an advertisement of a shop in the lower-traffic region, an indicator for indicating a per-cell traffic usage amount corresponding to a usage level, and a notice for recommending a medium change.

According to an aspect of the present invention, a method for operating a server in a wireless communication system is provided. The method includes collecting information on a per-cell traffic status, generating information regarding a lower-traffic region according to the per-cell traffic status, and providing the information regarding the lower-traffic region to a terminal, wherein the information regarding the lower-traffic region comprises at least one of an advertisement of a shop in the lower-traffic region and an indicator for indicating a per-cell traffic usage amount.

According to an aspect of the present invention, a terminal apparatus in a wireless communication system is provided. The apparatus includes at least one processor, a display element, and a memory for storing a module executed by the at least one processor, wherein the module comprises at least one instruction which generates a screen for showing information regarding a lower-traffic region and which displays the screen by using the display element, and wherein the screen comprises at least one of an advertisement of a shop in the lower-traffic region, an indicator for indicating a per-cell traffic usage amount corresponding to a usage level, and a notice for recommending a medium change.

According to an aspect of the present invention, a server apparatus in a wireless communication system is provided. The apparatus includes at least one processor, a memory for storing a module executed by the at least one processor, and a communication subsystem for providing an interface to perform communication, wherein the module comprises at least one instruction for collecting information on a per-cell traffic status, generating information regarding a lower-traffic region according to the per-cell traffic status, and providing the information regarding the lower-traffic region to a terminal, and wherein the information regarding the lower-traffic region comprises at least one of an advertisement of a shop in the lower-traffic region and an indicator for indicating a per-cell traffic usage amount.

According to an aspect of the present invention, a non-transitory computer-readable storage medium is provided, for storing one or more programs, performed by an electronic device, the one or more programs including instructions which allow the device to perform a method for operating a terminal in a wireless communication system, the method including generating a screen for showing information regarding a lower-traffic region, and displaying the generated screen by using a display element, wherein the generated screen includes at least one of an advertisement of a shop in the lower-traffic region, an indicator for indicating a per-cell traffic usage amount corresponding to a usage level, and a notice for recommending a medium change.

According to an aspect of the present invention, a non-transitory computer-readable storage medium is provided, for storing one or more programs, performed by an electronic device, the one or more programs including instructions which allow the device to perform a method for operating a server in a wireless communication system, the method including collecting information on a per-cell traffic status, generating information regarding a lower-traffic region according to the per-cell traffic status, and providing the information regarding the lower-traffic region to a terminal, wherein the information regarding the lower-traffic region comprises at least one of an advertisement of a shop in the lower-traffic region and an indicator for indicating a per-cell traffic usage amount.

BRIEF DESCRIPTION OF THE DRAWINGS

The above and other aspects, features and advantages of various embodiments of the present invention will be more apparent from the following detailed description taken in conjunction with the accompanying drawings, in which:

FIG. 1A and FIG. 1B are diagrams illustrating examples of a screen for showing a per-cell traffic status in a wireless communication system according to an embodiment of the present invention;

FIG. 12A is a flowchart illustrating a process of operating an electronic device in a wireless communication system according to an embodiment of the present invention; FIG. 12B is a block diagram illustrating a combination of corresponding elements for performing the process of FIG. 12A in a wireless communication system according to an embodiment of the present invention;

DETAILED DESCRIPTION OF EMBODIMENTS OF THE PRESENT INVENTION

Figure 1B:
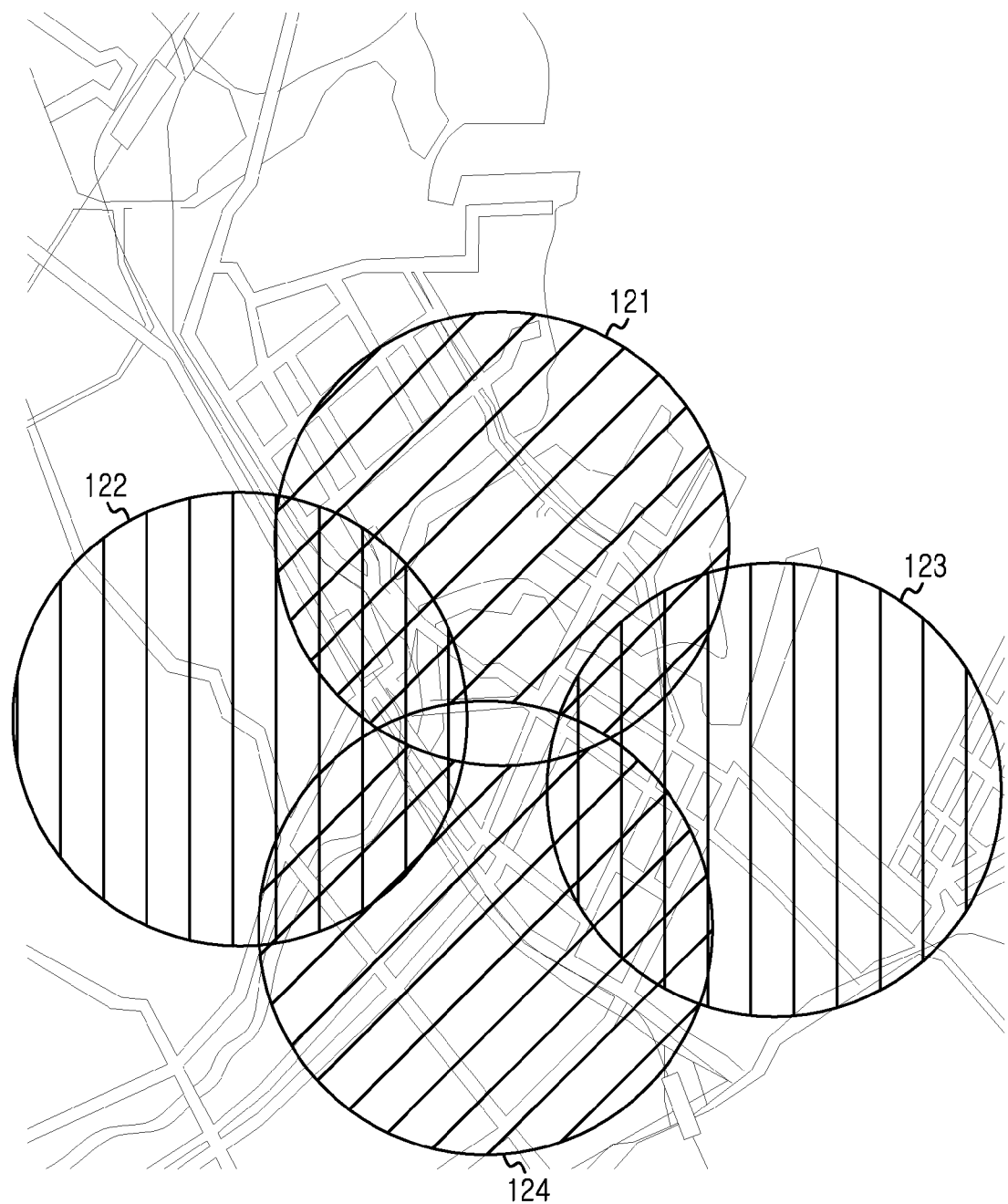

Hereinafter, various embodiments of the present invention are described with reference to the accompanying drawings. In the following description, the same drawing reference numerals refer to the same elements, features and structures throughout the drawings. Further, detailed description of known functions and configurations are omitted to avoid obscuring the subject matter of the present invention.

The present invention relates to an apparatus and method for dispersing users in a wireless communication system. According to an aspect of the present invention, there is provided a technique for preventing users from being concentrated in a specific cell in a wireless communication system.

According to an embodiment of the present invention, traffic imposed on a user-concentrated cell is distributed by inducing users to move to a cell having a relatively less traffic amount. Hereinafter, for convenience of explanation, the cell having the relatively less traffic amount is called a 'lower-traffic cell' or a lower-traffic region', and the user-concentrated cell is called a 'high-traffic cell' or a 'high-traffic region'.

According to an embodiment of the present invention, an electronic device visualizes a per-cell traffic status so that a user can recognize the traffic status. That is, a screen display is used to allow the user to recognize the traffic status, so that the user voluntarily moves to the lower-traffic region. For example, the electronic device displays a screen of FIG. 1A and FIG. 1B described below.

FIG. 1A and FIG. 1B are diagrams illustrating examples of a screen for showing a per-cell traffic status in a wireless communication system according to an embodiment of the present invention. FIG. 1A is a diagram illustrating an augmented reality scheme, and FIG. 1B is a diagram illustrating a map scheme. In FIG. 1A, coverage areas 111 and 112 of respective cells indicated by semi-circles on an image to be input to a camera overlap with each other. The coverage 111 indicated by a vertical line denotes a lower-traffic region, and the coverage 112 indicated by a diagonal line denotes a high-traffic region. In addition, coverage areas 121 to 124 of respective cells indicated by circles on an electronic map are illustrated in FIG. 1B. The coverage areas 122 and 123 indicated by a vertical line denote a lower-traffic region, and the coverage areas 121 and 124 indicated by a diagonal line denote a high-traffic region. In FIG. 1A and FIG. 1B, a traffic status is represented in two levels, e.g., high, less, etc. However, according to an embodiment of the present invention, the traffic status is divided into three or more levels. In this case, the traffic status is represented by using a color, a text, a number, a figure, and the like.

According to an embodiment of the present invention, the electronic device provides a road guide service for guiding to the lower-traffic region. That is, the electronic device provides a navigation service by setting the lower-traffic region as a destination. In this case, the electronic device guides a plurality of lower-traffic regions. Further, the electronic device assigns a priority to the plurality of lower-traffic regions, and displays the priority. Alternatively, the electronic device displays the plurality of lower-traffic regions, and guides one lower-traffic region in accordance with a user selection.

According to an embodiment of the present invention, if the electronic device supports a plurality of media, the electronic device guides another medium having a less traffic amount in addition to a medium which currently receives a service. For example, when the electronic device is currently in connection with a mobile communication system, the electronic device may recommend a medium change to a Wireless Local Area Network (WLAN), that is, a handover to a heterogeneous network. To recommend the medium change, the electronic device displays a screen which shows a notice for recommending the medium change and information for indicating a medium to be changed.

According to an embodiment of the present invention, the electronic device may induce distribution of users by using an indirect means. For example, the indirect means includes providing of a coupon of a shop located in a lower-traffic region. For example, the coupon includes a discount coupon, a social coupon, a movie ticket, etc. Accordingly, the user can be expected to move to the lower-traffic region without a direct recognition on traffic concentration. For example, the electronic device displays screens of FIG. 2A and FIG. 2B.

Figure 2A:
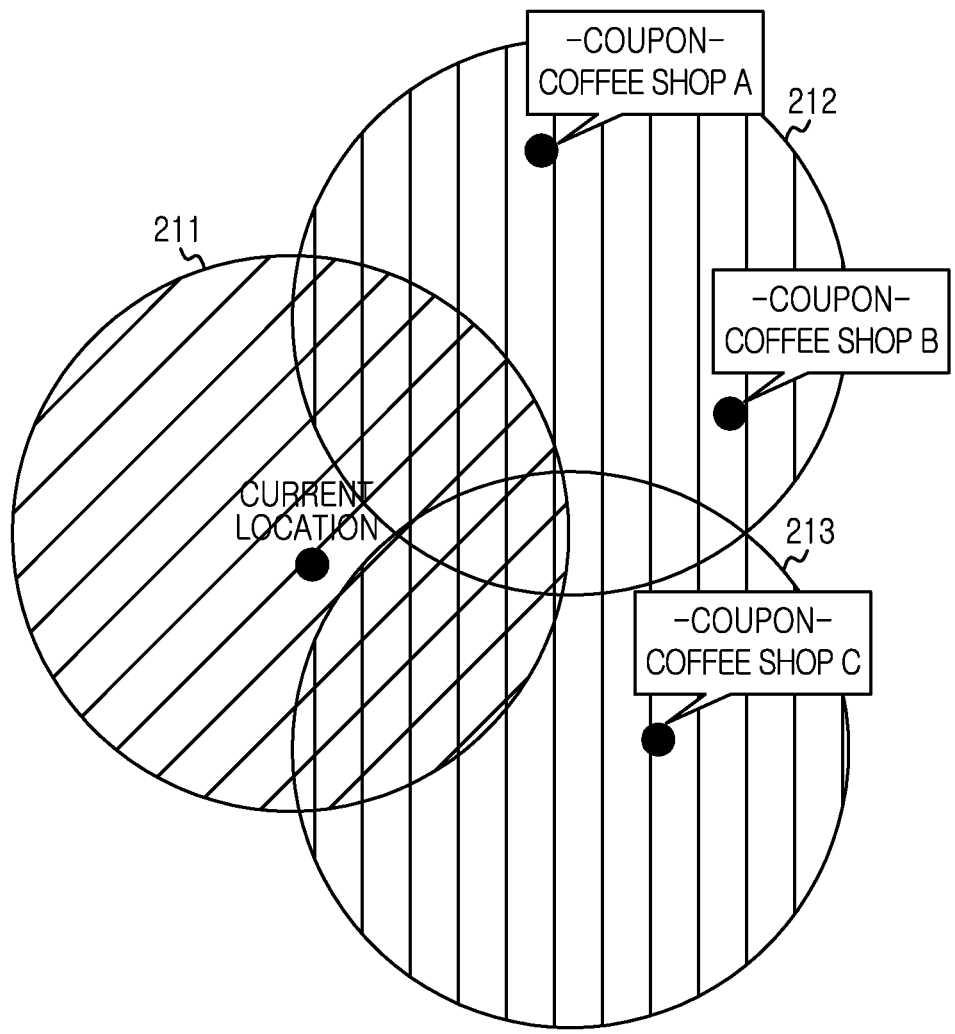
FIG. 2A and FIG. 2B are diagrams illustrating examples of a screen for providing a coupon in a wireless communication system according to an embodiment of the present invention.
Figure 2B:
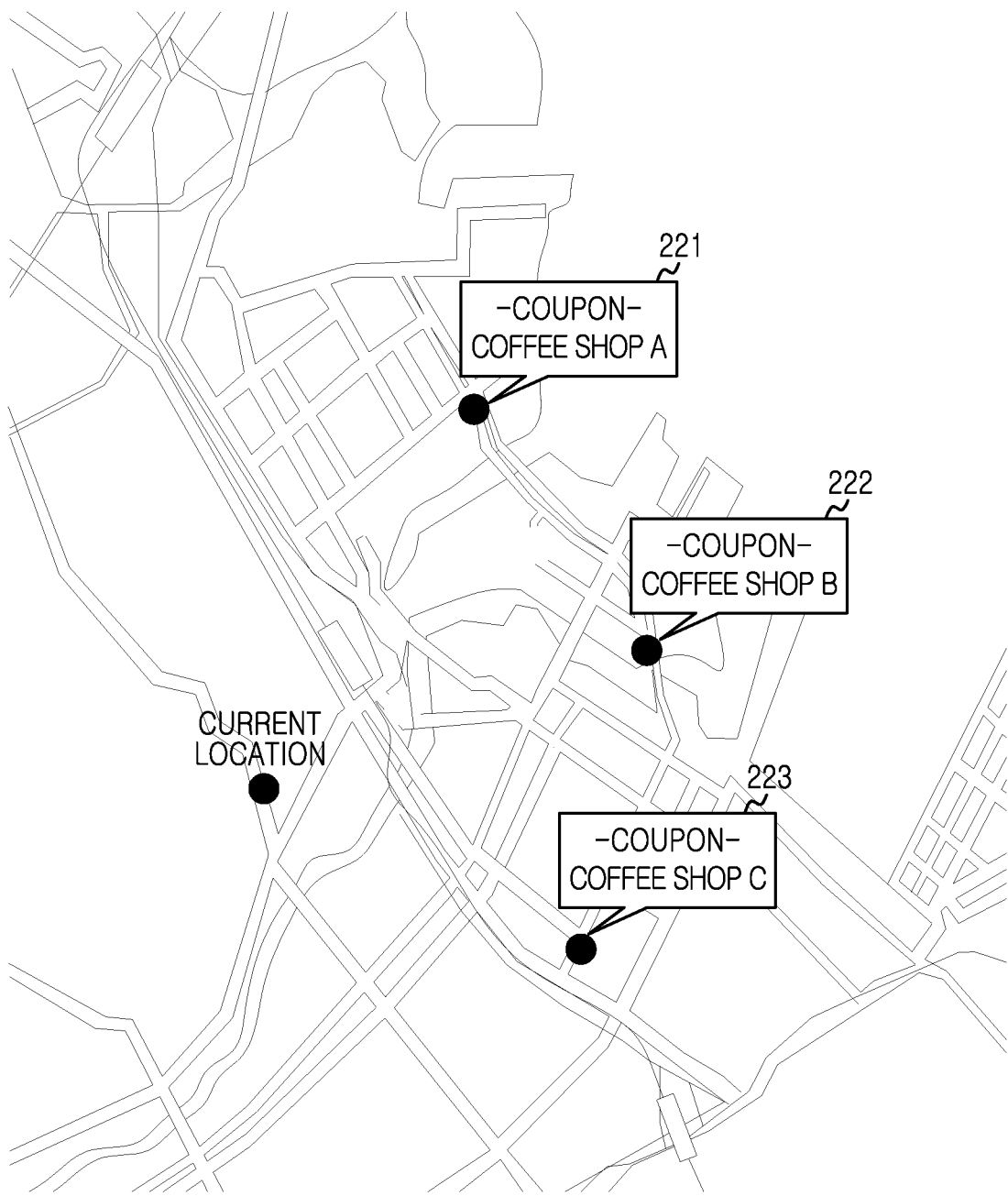

FIG. 2A and FIG. 2B illustrate examples of a screen for providing a coupon in a wireless communication system according to an embodiment of the present invention. Coverage areas 211 to 213 of respective cells indicated by circles are illustrated in FIG. 2A. The coverage areas 212 and 213 indicated by a vertical line denote a lower-traffic region, and the coverage 211 indicated by a diagonal line denotes a high-traffic region. Since an electronic device is located in the high-traffic region, the electronic device provides coupons 221 to 223 which can be used in shops located in the lower-traffic region, and displays locations of the shops in which the coupons 221 to 223 can be used. As illustrated in FIG. 2B, the electronic device displays only the coupons 221 to 223 and the locations of the shops on a map without having to display the coverage areas. Further, in accordance with a user's selection, the electronic device provides a navigation service to a selected shop.

The user distribution schemes described above may be performed according to a user's instruction, or if a pre-defined specific condition is satisfied, may be performed without a user's intervention. For example, the above-described user distribution scheme may be performed when a traffic load of a serving cell exceeds a predetermined threshold. Herein, the threshold may be determined based on a data usage amount of each user, or may be determined to the same value with respect to all users. For another example, the above-described user distribution scheme may be performed when the electronic device intends to handover to a high-traffic region.

In order to perform the above-described user distribution scheme, a system provides the electronic device with traffic status information, coupon information, etc. If the traffic load of the serving cell is significantly high and thus the traffic status information or the like cannot be received, the system may deliver the information through an additional channel other than a typical traffic channel. For example, the additional channel includes a Short Message Service (SMS) channel, a telephone network, a channel assigned as an emergency contact network, etc.

Figure 3:
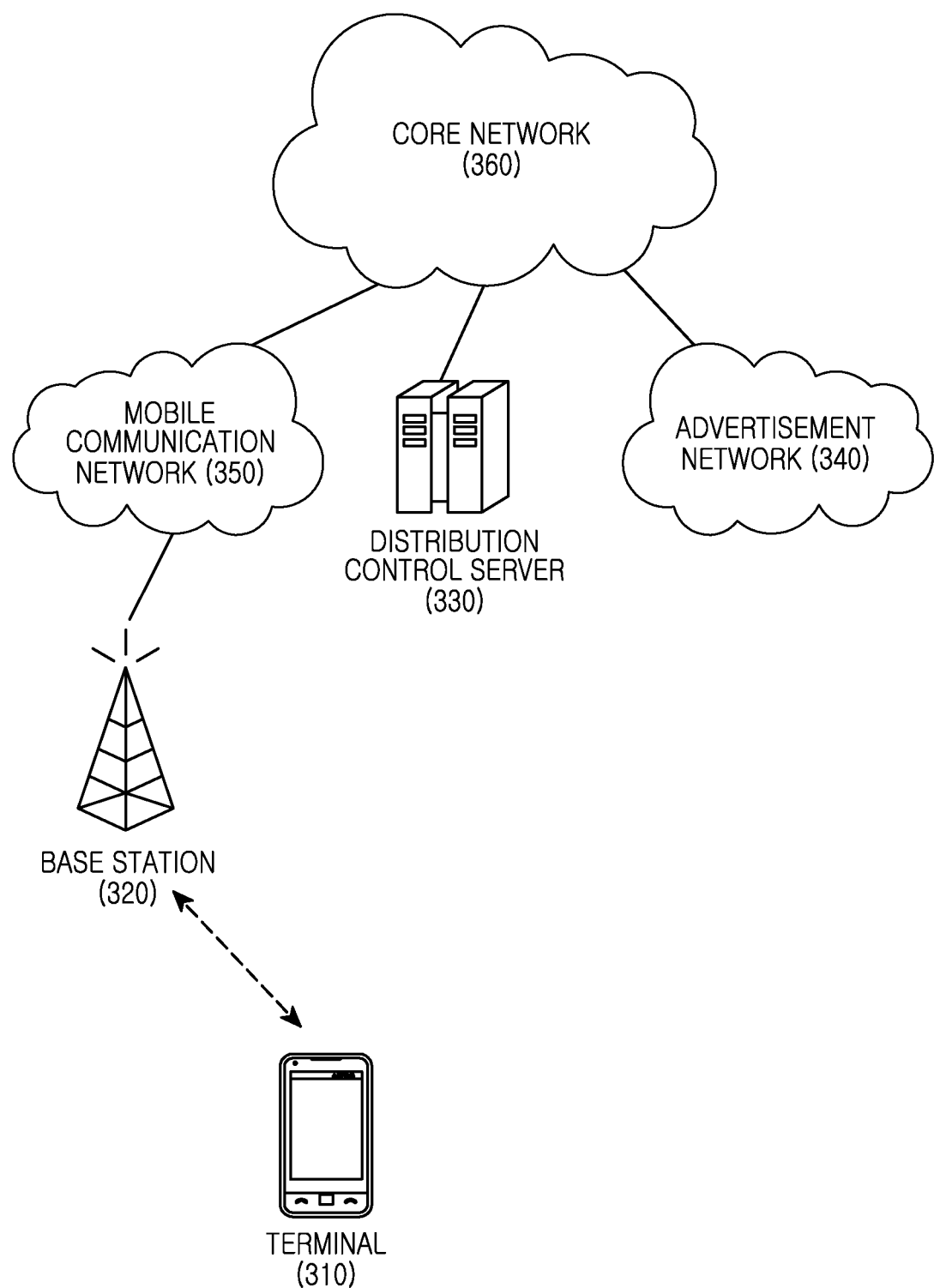
FIG. 3 is a diagram illustrating a wireless communication system according to an embodiment of the present invention.

FIG. 3 is a diagram illustrating a wireless communication system according to an embodiment of the present invention. A logical structure of a system is illustrated in FIG. 3 according to the embodiment of the present invention. A plurality of entities of FIG. 3 may be present in a separate manner, or one entity may be combined with another entity as one entity.

Referring to FIG. 3, the system according to the embodiment of the present invention includes an electronic device 310, a base station 320, a distribution control server 330, an advertisement network 340, a mobile communication network 350, and a core network 360.

As a user device, the electronic device 310 accesses the base station 320, and accesses to the core network 360 via the base station 320. According to an embodiment of the present invention, the electronic device 310 displays the screen of FIG. 1A, FIG. 1B, FIG. 2A, and FIG. 2B. More specifically, the electronic device 310 may generate or display a screen including at least one of an advertisement of a shop in a lower-traffic region, an indicator for indicating a per-cell traffic usage amount corresponding to a usage level, and a notice for recommending a medium change.

The base station 320 provides a wireless access to the electronic device 310. Although only one base station 320 is illustrated in FIG. 3, the base station may be plural in number. According to an embodiment of the present invention, the base station 320 provides traffic status information to the distribution control server 330. According to an embodiment of the present invention, the base station 320 includes the distribution control server 330.

The distribution control server 330 is an entity for controlling the above-described user distribution scheme. The distribution control server 330 may be called an "agent." According to an embodiment of the present invention, the distribution control server 330 collects traffic statuses of a plurality of base stations including the base station 320, performs traffic modeling, and then provides traffic modeling information to the electronic device 310. Herein, the traffic modeling information includes information which indicates a per-cell traffic status. That is, the traffic modeling implies a procedure in which traffic statuses of the base stations are processed to be easily understood by a user. According to an embodiment of the present invention, the distribution control server 330 analyzes user's preference, tendency, etc., receives advertisement information from the advertisement network 340, and then provides the electronic device 310 with the advertisement information suitable to the user's preference, tendency, etc. Herein, basic information for analyzing the user's preference, tendency, etc., may be provided from the electronic device 310, or may be provided from a network vendor. According to an embodiment of the present invention, the distribution control server 330 may be a part of the base station 320. According to an embodiment of the present invention, some or all functions of the distribution control server 330 may be performed by the electronic device 310.

The advertisement network 340 has advertisement information, and provides the advertisement information to a permitted requestor. The advertisement network 340 may include one server, or may include a set of a plurality of entities. The mobile communication network 350 is a network for managing wireless communication, mobility, or the like of the electronic device 310. The mobile communication network 350 includes a gateway, an authentication server, etc., and includes the base station 320 in concept. The core network 360 includes an Internet Protocol (IP) network.

Figure 4:
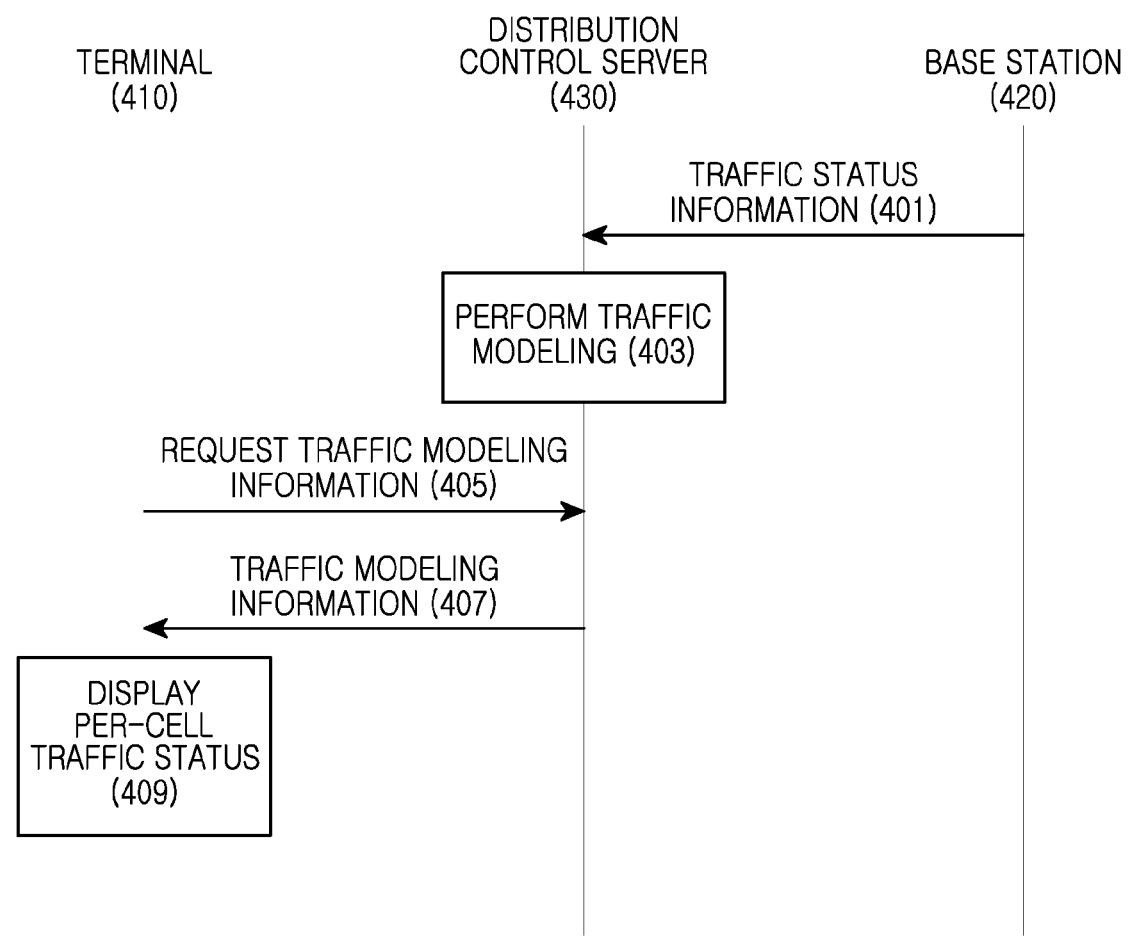
FIG. 4 is a diagram illustrating a signal exchange process for user distribution in a wireless communication system according to an embodiment of the present invention.

FIG. 4 is a diagram illustrating a signal exchange process for user distribution in a wireless communication system according to an embodiment of the present invention.

Referring to FIG. 4, a base station 420 provides its traffic status information to a distribution control server 430 in Step 401. For example, the traffic status information includes at least one of a traffic usage amount, a total capacity to traffic usage rate, a resource usage rate, and the number of connected users. According to an embodiment of the present invention, the traffic status information may be provided either on a real-time basis or periodically in accordance with a specific time interval. According to an embodiment of the present invention, the traffic status information may be provided at the request of the distribution control server 430.

In Step 403, the distribution control server 430 collects traffic status information of a plurality of base stations, and then performs traffic modeling. For example, the distribution control server 430 classifies cells of the plurality of base stations into pre-defined levels based on a traffic usage amount. To this end, the distribution control server 430 may store at least one threshold for the traffic usage amount. For example, the pre-defined levels include two or more levels.

In Step 405, an electronic device 410 requests the distribution control server 430 to provide traffic modeling information. The requesting of the traffic modeling information may be performed by a user's instruction or may be performed when a pre-defined specific condition is satisfied. For one example, when a traffic load of a serving cell exceeds a predetermined threshold, the electronic device 410 may request the traffic modeling information. For another example, the electronic device 410 may request the traffic modeling information when the electronic device intends to handover to a high-traffic region.

In Step 407, the distribution control server 430 provides the traffic modeling information to the electronic device 410. In this case, the distribution control server 430 provides recently generated traffic modeling information. According to an embodiment of the present invention, after receiving the request from the electronic device 410, the distribution control server 430 may perform Step 401 and Step 403, or may perform Step 403. That is, the distribution control server 430 may perform the traffic modeling at the request of the electronic device 410.

In Step 409, the electronic device 410 displays a per-cell traffic status. In this case, the electronic device 410 displays the traffic status by using the augmented reality scheme of FIG. 1A, or displays the traffic status by using the map scheme of FIG. 1B. In this case, the electronic device 410 displays a traffic status of each cell by using at least one of a color, a text, a number, and a figure.

As illustrated in FIG. 4, the traffic modeling is performed by the distribution control server 430. Alternatively, the traffic modeling may be performed by the electronic device 410. In this case, the distribution control server 430 provides unprocessed traffic status information to the electronic device 410, and the electronic device 410 may perform the traffic modeling.

Figure 5:
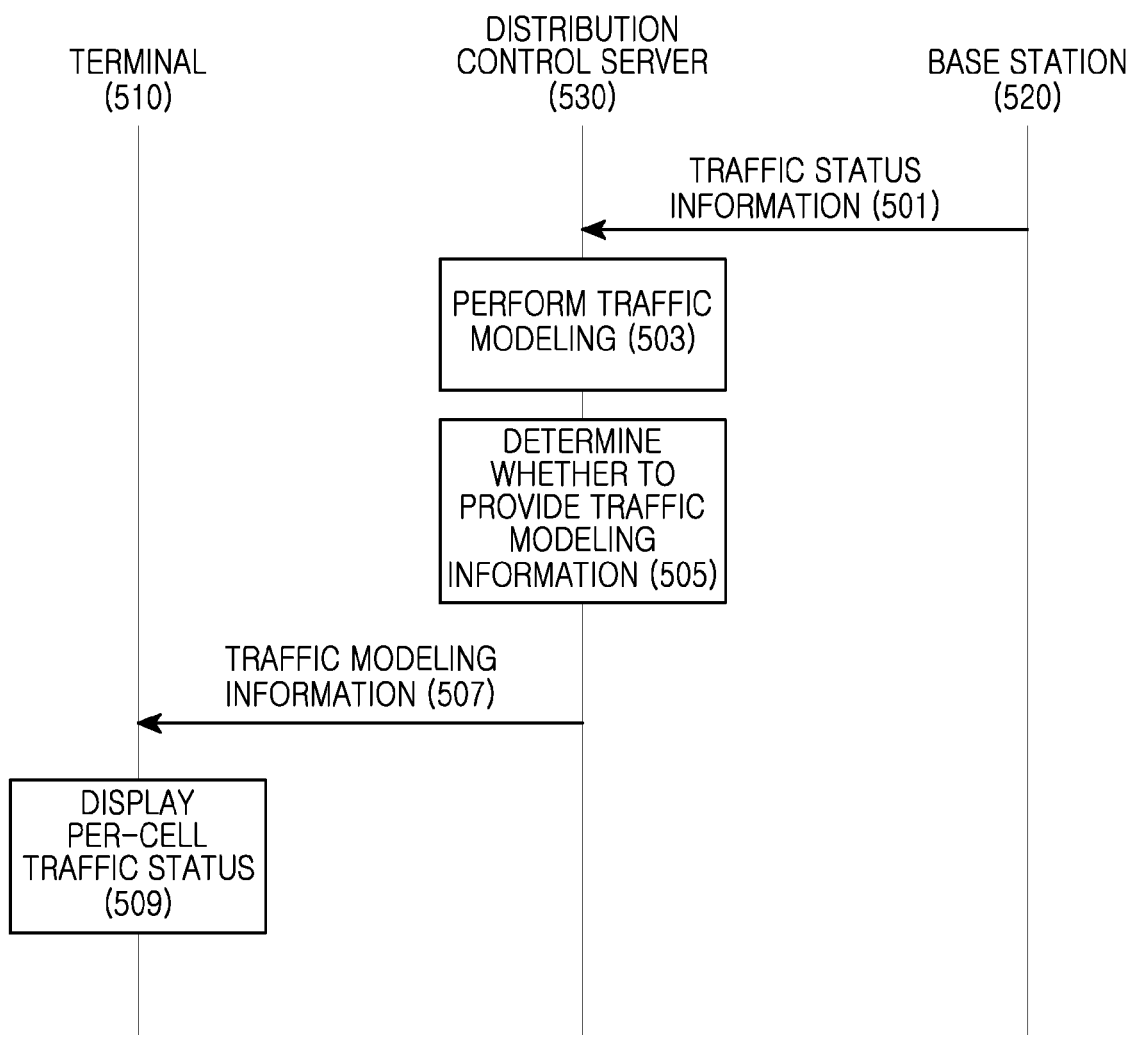
FIG. 5 is a diagram illustrating a signal exchange process for user distribution in a wireless communication system according to an embodiment of the present invention.

FIG. 5 is a diagram illustrating a signal exchange process for user distribution in a wireless communication system according to an embodiment of the present invention.

Referring to FIG. 5, a base station 520 provides its traffic status information to a distribution control server 530 in Step 501. For example, the traffic status information includes at least one of a traffic usage amount, a total capacity to traffic usage rate, a resource usage rate, and the number of connected users. According to an embodiment of the present invention, the traffic status information may be provided either on a real-time basis or periodically in accordance with a specific time interval. Alternatively, the traffic status information may be provided at the request of the distribution control server 530.

In Step 503, the distribution control server 530 collects traffic status information of a plurality of base stations, and then performs traffic modeling. That is, the distribution control server 530 classifies cells of the plurality of base stations into pre-defined levels based on a traffic usage amount. To this end, the distribution control server 530 may store at least one threshold for the traffic usage amount. For example, the pre-defined levels include two or more levels.

In Step 505, the distribution control server 530 determines whether to provide the traffic modeling information. The traffic modeling information may be provided when a pre-defined specific condition is satisfied. For example, if a traffic load of a serving cell of the electronic device 510 exceeds a predetermined threshold, the traffic modeling information may be provided when the electronic device 510 intends to handover to a high-traffic region. Alternatively, whether to provide the traffic status information may be determined by a base station. In this case, if the base station determines to provide the traffic status information, the base station requests the distribution control server 530 to provide the traffic modeling information.

In Step 507, upon determining to provide the traffic modeling information, the distribution control server 530 provides the traffic modeling information to the electronic device 510. In this case, the distribution control server 530 provides recently generated traffic modeling information.

In Step 509, upon receiving the traffic modeling information, the electronic device 510 displays a per-cell traffic status. In this case, the electronic device 510 displays the traffic status by using the augmented reality scheme of FIG. 1A, or displays the traffic status by using the map scheme of FIG. 1B. In this case, the electronic device 510 displays a traffic status of each cell by using at least one of a color, a text, a number, and a figure.

As illustrated in FIG. 5, the traffic modeling is performed by the distribution control server 530. Alternatively, the traffic modeling may be performed by the electronic device 510. In this case, the distribution control server 530 provides unprocessed traffic status information to the electronic device 510, and the electronic device 510 may perform the traffic modeling.

Figure 6:
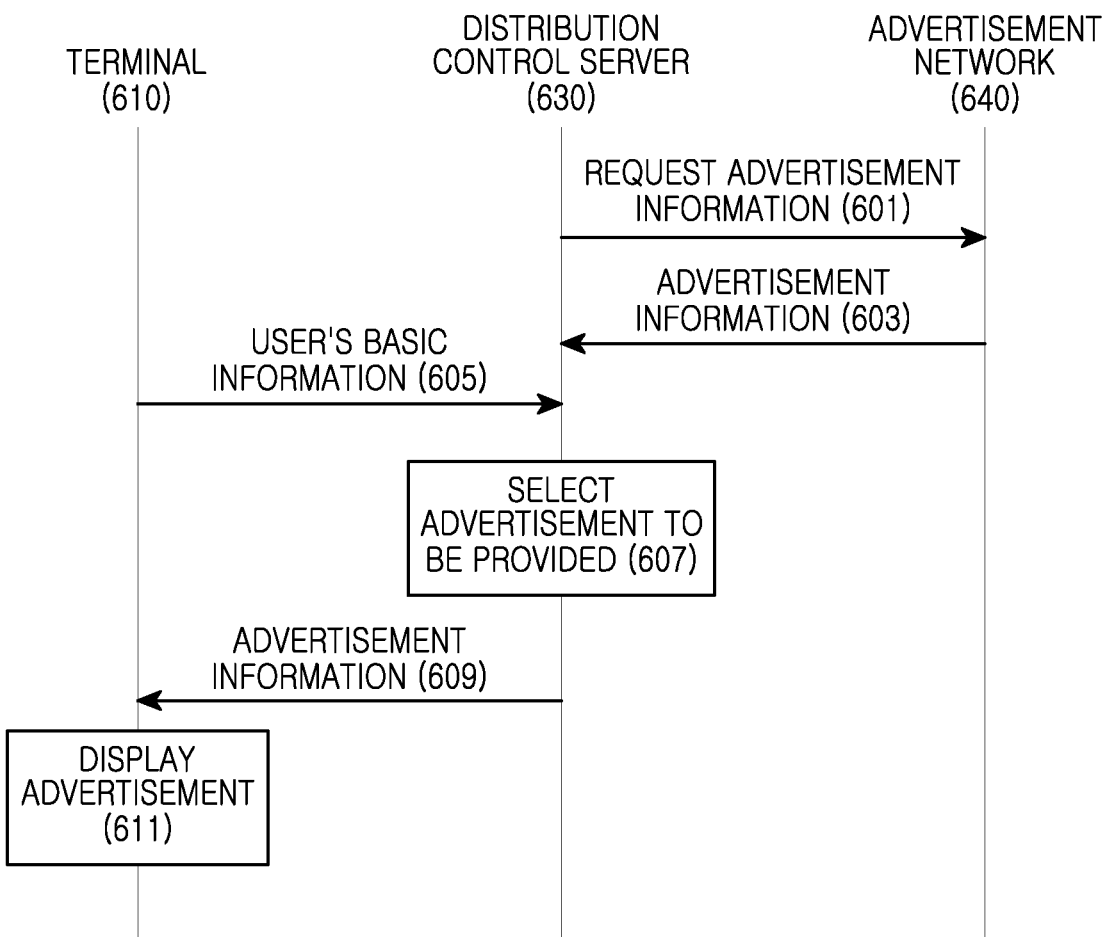
FIG. 6 is a diagram illustrating a signal exchange process for user distribution in a wireless communication system according to an embodiment of the present invention.

FIG. 6 is a diagram illustrating a signal exchange process for user distribution in a wireless communication system according to an embodiment of the present invention.

Referring to FIG. 6, a distribution control server 630 requests an advertisement network 640 to provide advertisement information of a lower-traffic region in Step 601. That is, the distribution control server 630 requests advertisement information regarding shops located in the lower-traffic region. To this end, although not illustrated, the distribution control server 630 may collect traffic status information of base stations, and may identify the lower-traffic region. Alternatively, the distribution control server 630 may request advertisement information of all regions including the lower-traffic region.

In Step 603, the advertisement network 640 provides advertisement information to the distribution control server 630. For example, the advertisement information includes at least one of a discount coupon, a social coupon, and a movie ticket which can be used in a shop or the like located in the lower-traffic region.

In Step 605, an electronic device 610 provides user's basic information to the distribution control server 630. Herein, the user's basic information includes information for analyzing user's preference, that is, information required to select a coupon which may draw user's attention. For example, the user's basic information includes at least one of a gender, an age group, a per-service frequency of usage, whether in a car, a data usage amount, and a coupon usage history. Some of the items listed above are stored as subscriber information of a mobile communication network. In this case, the some parts of the information are provided from the mobile communication network.

In Step 607, the distribution control server 630 selects an advertisement to be provided to the electronic device 610. That is, by analyzing user's basic information provided from the electronic device 610 and information provided from the mobile communication system, the distribution control server 630 selects at least one coupon or the like to draw user's attention. However, the distribution control server 630 selects the advertisement to be provided among advertisements that can be used in a shop in a lower-traffic region neighboring to a current location. Alternatively, the advertisement selection operation of Step 607 is performed by the electronic device 610.

In Step 609, the distribution control server 630 provides the selected advertisement information to the electronic device 610. In accordance with a traffic amount of a serving cell of the electronic device 610, the advertisement information is delivered through an additional channel other than a typical traffic channel. For example, the additional channel includes an SMS channel, a telephone network, a channel assigned as an emergency contact network, etc. If the advertisement selection operation of Step 607 is performed by the electronic device 610, Step 607 may be skipped. In this case, Step 605 may also be skipped.

In Step 611, the electronic device 610 displays an advertisement by using a display element. For example, the electronic device 610 displays the screen of FIG. 2A or FIG. 2B. That is, the electronic device displays a location of a shop and a coupon that can be used in the shop while displaying a traffic status, or displays on a map the location of the shop and the coupon that can be used in the shop. Thereafter, the electronic device 610 provides a road guide service for the shop in accordance with a user's selection.

Figure 7:
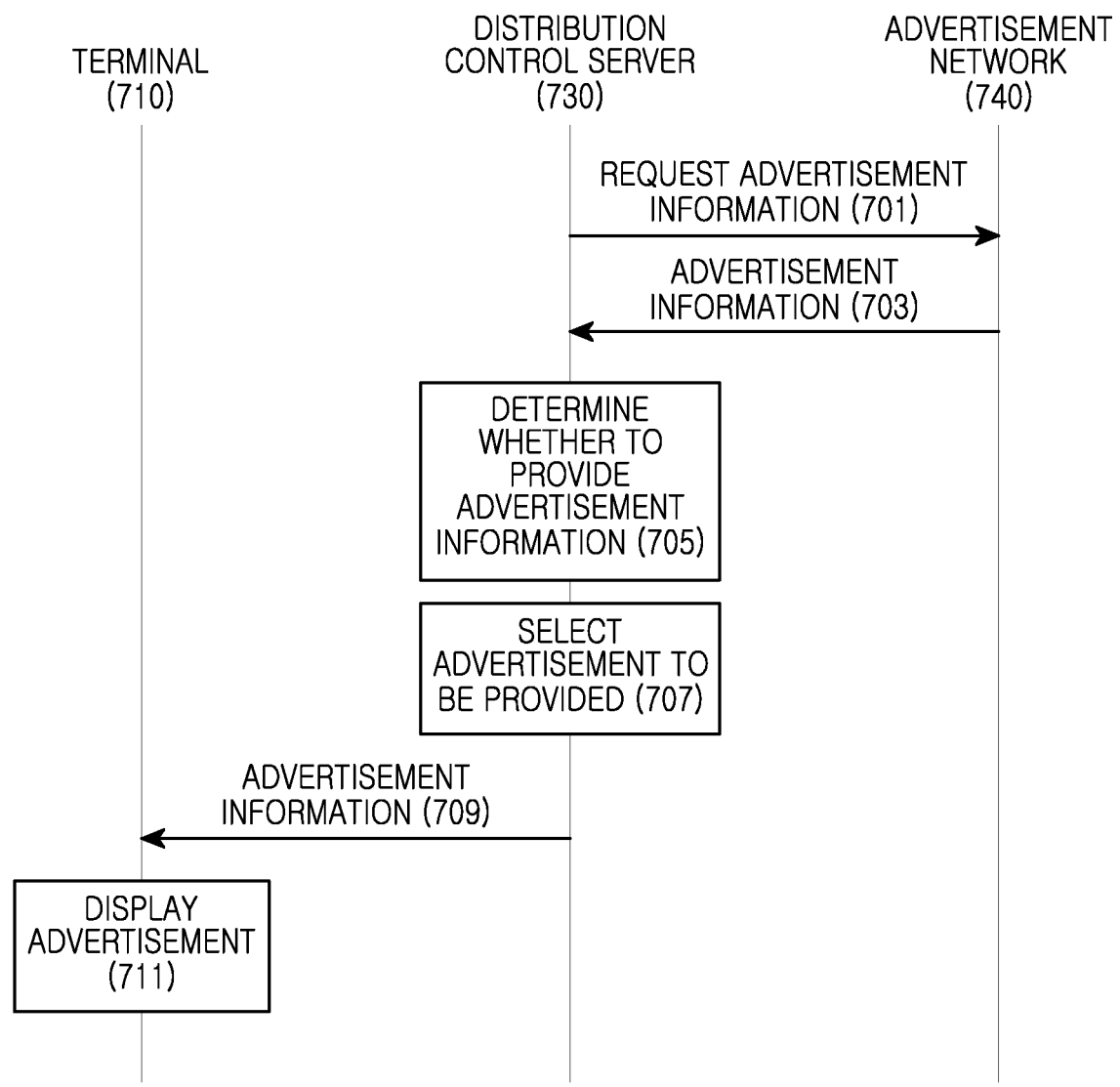
FIG. 7 is a diagram illustrating a signal exchange process for user distribution in a wireless communication system according to an embodiment of the present invention.

FIG. 7 is a diagram illustrating a signal exchange process for user distribution in a wireless communication system according to an embodiment of the present invention.

Referring to FIG. 7, a distribution control server 730 requests an advertisement network 740 to provide advertisement information of a lower-traffic region in Step 701. That is, the distribution control server 730 requests advertisement information regarding shops located in the lower-traffic region. To this end, although not illustrated, the distribution control server 730 may collect traffic status information of base stations, and may identify the lower-traffic region. Alternatively, the distribution control server 730 may request advertisement information of all regions including the lower-traffic region.

In Step 703, the advertisement network 740 provides advertisement information to the distribution control server 730. For example, the advertisement information includes at least one of a discount coupon, a social coupon, and a movie ticket which can be used in a shop or the like located in the lower-traffic region.

In Step 705, the distribution control server 730 determines whether to provide the advertisement information. The advertisement information may be provided when a pre-defined specific condition is satisfied. For example, if a traffic load of a serving cell of the electronic device 710 exceeds a predetermined threshold, the advertisement information may be provided when the electronic device 710 intends to handover to a high-traffic region. Alternatively, whether to provide the traffic status information may be determined by a base station. In this case, if the base station determines to provide the traffic status information, the base station requests the distribution control server 730 to provide the advertisement information.

In Step 707, upon determining to provide the traffic modeling information, the distribution control server 730 selects an advertisement to be provided to the electronic device 710. That is, by analyzing user's basic information provided from the electronic device 710 and information provided from the mobile communication system, the distribution control server 730 selects at least one coupon or the like which may draw user's attention. However, the distribution control server 730 selects the advertisement to be provided among advertisements that can be used in a shop in a lower-traffic region neighboring to a current location. Herein, the user's basic information includes information for analyzing user's preference, that is, information required to select a coupon which may draw user's attention. For example, the user's basic information includes at least one of a gender, an age group, a per-service frequency of usage, whether in a car, a data usage amount, and a coupon usage history. The items listed above may be provided from the mobile communication network. Alternatively, the advertisement selection operation of Step 707 may be performed by the electronic device 710.

In Step 709, the distribution control server 730 provides the selected advertisement information to the electronic device 710. In accordance with a traffic amount of a serving cell of the electronic device 710, the advertisement information may be delivered through an additional channel other than a typical traffic channel. For example, the additional channel includes an SMS channel, a telephone network, a channel assigned as an emergency contact network, etc. If the advertisement selection operation of Step 705 is performed by the electronic device 710, Step 705 may be skipped.

In Step 711, the electronic device 710 displays an advertisement by using a display element. For example, the electronic device 710 displays the screen of FIG. 2A or FIG. 2B. That is, the electronic device displays a location of a shop and a coupon that can be used in the shop while displaying a traffic status, or displays on a map the location of the shop and the coupon that can be used in the shop. Thereafter, the electronic device 710 provides a road guide service for the shop in accordance with a user's selection.

Hereinafter, the present invention will describe operations and structures of a distribution control server and an electronic device for performing the above-described user distribution scheme in detail with reference to the accompanying drawings.

FIG. 8 is a diagram illustrating a process of operating a distribution control server and a combination of corresponding elements in a wireless communication system according to an embodiment of the present invention.

Figure 8A:
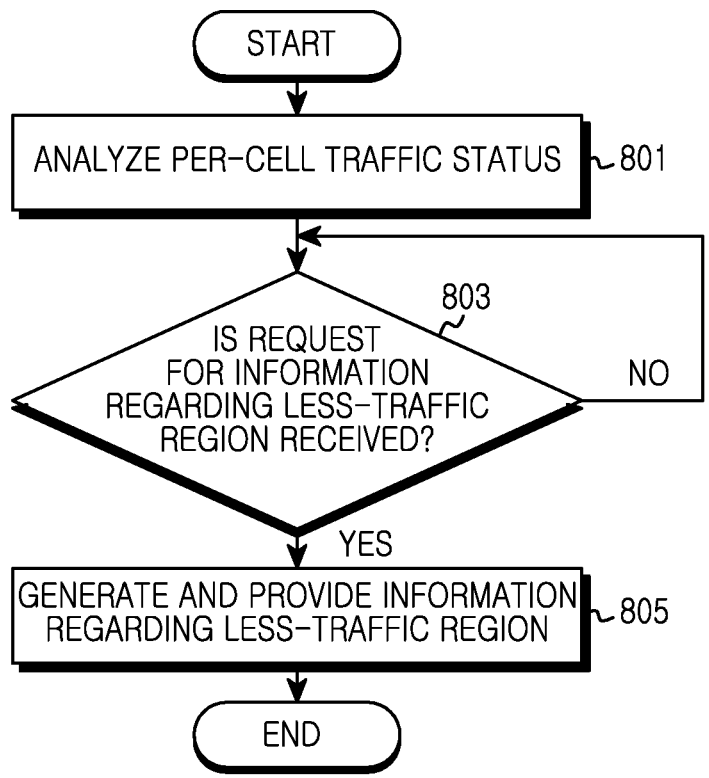
FIG. 8A is a flowchart illustrating a process of operating a distribution control server in a wireless communication system according to an embodiment of the present invention.

Referring to FIG. 8A, the distribution control server analyzes a per-cell traffic status in Step 801. In order to analyze the traffic status, the distribution control server collects traffic status information from a plurality of base stations. The traffic status information provided from the base station includes at least one of a traffic usage amount, a total capacity to traffic usage rate, a resource usage rate, and the number of connected users. According to an embodiment of the present invention, the traffic status information may be provided either on a real-time basis or periodically in accordance with a specific time interval. Alternatively, the traffic status information may be provided at the request of the distribution control server.

In Step 803, the distribution control server determines whether a request for information regarding a lower-traffic region is received. The information regarding the lower-traffic region may be provided at the request of an electronic device. Alternatively, the information regarding the lower-traffic region may be provided at the request of a base station. According to an embodiment of the present invention, the information regarding the lower-traffic region includes traffic modeling information which indicates a per-cell traffic usage amount corresponding to a usage level. Alternatively, the information regarding the lower-traffic region may be advertisement information that can be used in a shop in the lower-traffic region. For example, if the information regarding the lower-traffic region is the advertisement information, user's basic information required to select an advertisement to be provided may be received together with a request from the electronic device. For example, the user's basic information includes at least one of a gender, an age group, a per-service frequency of usage, whether in a car, a data usage amount, and a coupon usage history. Some of the items listed above may be stored as subscriber information of a mobile communication network. In this case, the some parts of the information may be provided from the mobile communication network.

If it is determined that there is a need to provide the information regarding the lower-traffic region, in Step 805, the distribution control server generates the information regarding the lower-traffic region, and provides the information regarding the lower-traffic region to the electronic device. The detailed procedure of Step 805 may differ depending on the content of the information regarding the lower-traffic region. For one example, if the information regarding the lower-traffic region is the traffic modeling information, the distribution control server may operate as descried below with reference to FIG. 10. For another example, if the information regarding the lower-traffic region is the advertisement information, the distribution control server may operate as descried below with reference to FIG. 11. If a traffic load of a serving cell of the electronic device is significantly high and thus cannot transmit the information for user distribution, the distribution control server may deliver the information through an additional channel other than a typical traffic channel. For example, the additional channel includes an SMS channel, a telephone network, a channel assigned as an emergency contact network, etc.

Figure 8B:
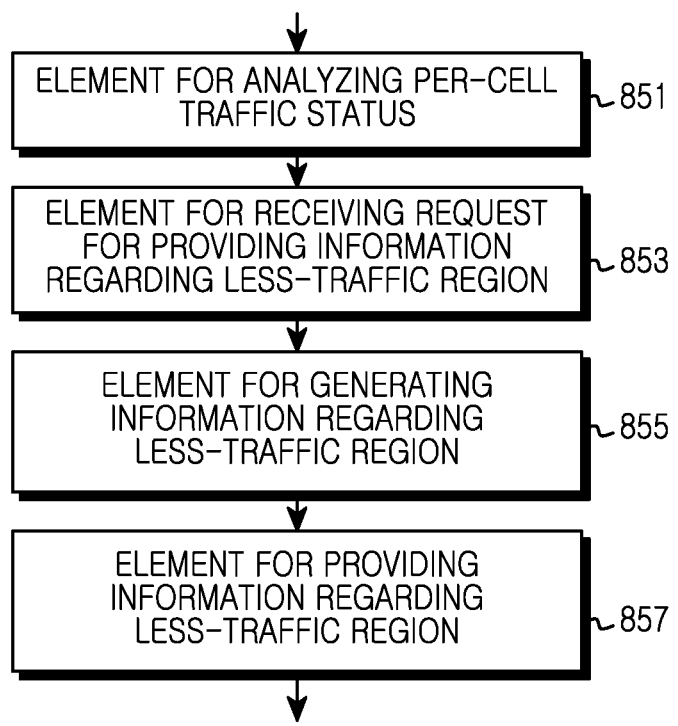
FIG. 8B is a block diagram illustrating a combination of corresponding elements for performing the process of FIG. 8A in a wireless communication system according to an embodiment of the present invention.

In order for the distribution control server to perform the process of FIG. 8A, the distribution control server includes the elements of FIG. 8B. Referring to FIG. 8B, the distribution control server includes an element 851 for analyzing a per-cell traffic status, an element 853 for receiving a request for providing information regarding a lower-traffic region, an element 855 for generating the information regarding the lower-traffic region, and an element 857 for transmitting the information regarding the lower-traffic region.

The method described above in relation with FIG. 8 of the present invention may be provided as one or more instructions in one or more software modules, or computer programs stored in an electronic device including a server.

FIG. 9 is a diagram illustrating a process of operating a distribution control server and a combination of corresponding elements in a wireless communication system according to an embodiment of the present invention.

Figure 9A:
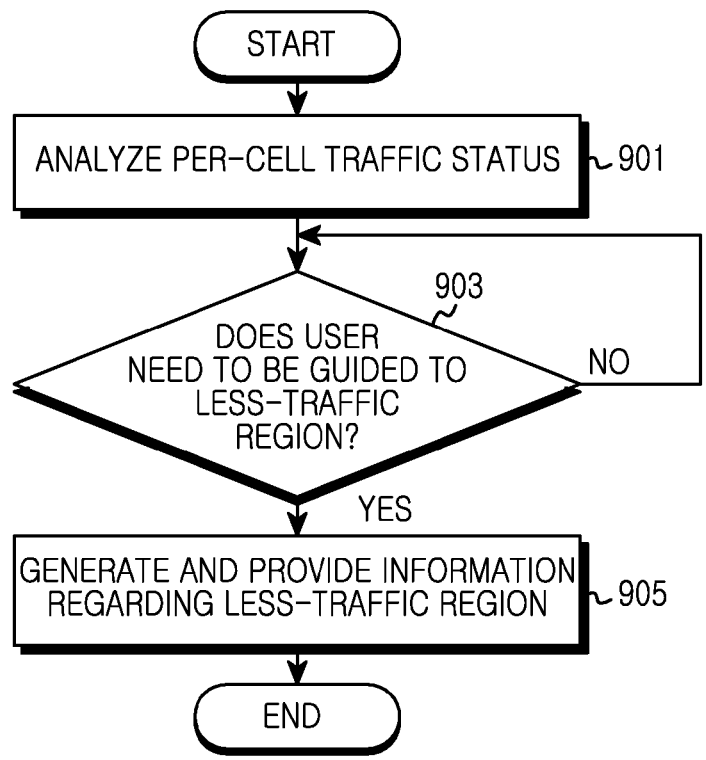
FIG. 9A is a flowchart illustrating a process of operating a distribution control server in a wireless communication system according to an embodiment of the present invention.

Referring to FIG. 9A, the distribution control server analyzes a per-cell traffic status in Step 901. In order to analyze the traffic status, the distribution control server collects traffic status information from a plurality of base stations. The traffic status information provided from the base station includes at least one of a traffic usage amount, a total capacity to traffic usage rate, a resource usage rate, and the number of connected users. According to an embodiment of the present invention, the traffic status information may be provided either on a real-time basis or periodically in accordance with a specific time interval. Alternatively, the traffic status information may be provided at the request of the distribution control server.

In Step 903, the distribution control server determines whether a user needs to be guided to a lower-traffic region. That is, the distribution control server determines whether the information regarding the lower-traffic region needs to be provided to an electronic device. The information regarding the lower-traffic region may be provided without a user intervention if a pre-defined specific condition is satisfied. For example, the specific condition includes whether the electronic device handovers to a high-traffic region. In addition, the specific condition includes whether a traffic load of a serving cell of the electronic device exceeds a predetermined threshold. According to an embodiment of the present invention, the information regarding the lower-traffic region includes traffic modeling information which indicates a per-cell traffic usage amount corresponding to a usage level. Alternatively, the information regarding the lower-traffic region may be advertisement information that can be used in a shop in the lower-traffic region. For example, if the information regarding the lower-traffic region is the advertisement information, user's basic information required to select an advertisement to be provided may be received together with a request from the electronic device. For example, the user's basic information includes at least one of a gender, an age group, a per-service frequency of usage, whether in a car, a data usage amount, and a coupon usage history. Some of the items listed above may be stored as subscriber information of a mobile communication network. In this case, the some parts of the information may be provided from the mobile communication network.

If it is determined that there is a need to provide the information regarding the lower-traffic region, in Step 905, the distribution control server generates the information regarding the lower-traffic region, and provides the information regarding the lower-traffic region to the electronic device. The detailed procedure of Step 905 may differ depending on the content of the information regarding the lower-traffic region. For one example, if the information regarding the lower-traffic region is the traffic modeling information, the distribution control server may operate as descried below with reference to FIG. 10. For another example, if the information regarding the lower-traffic region is the advertisement information, the distribution control server may operate as descried below with reference to FIG. 11. If a traffic load of a serving cell of the electronic device is significantly high and thus cannot transmit the information for user distribution, the distribution control server may deliver the information through an additional channel other than a typical traffic channel. For example, the additional channel includes an SMS channel, a telephone network, a channel assigned as an emergency contact network, etc.

Figure 9B:
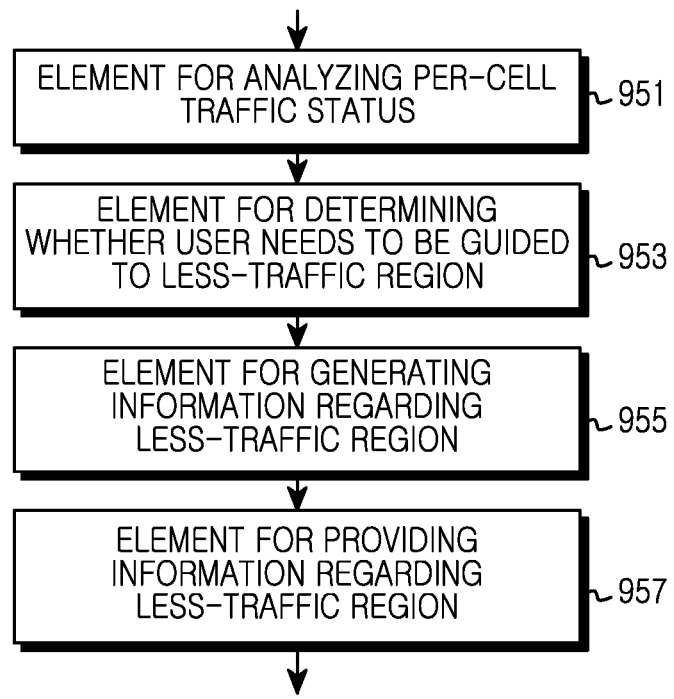
FIG. 9B is a block diagram illustrating a combination of corresponding elements for performing the process of FIG. 9A in a wireless communication system according to an embodiment of the present invention.

In order for the distribution control server to perform the process of FIG. 9A, the distribution control server includes the elements of FIG. 9B. Referring to FIG. 9B, the distribution control server includes an element 951 for analyzing a per-cell traffic status, an element 953 for determining whether a user needs to be guided to a lower-traffic region, an element 955 for generating the information regarding the lower-traffic region, and an element 957 for transmitting the information regarding the lower-traffic region.

The method described above in relation with FIG. 9 of the present invention may be provided as one or more instructions in one or more software modules, or computer programs stored in an electronic device including a server.

FIG. 10 is a diagram illustrating a process of generating information regarding a lower-traffic region and a combination of corresponding elements in a wireless communication system according to an embodiment of the present invention. That is, FIG. 10 is a diagram illustrating a case where the information regarding the lower-traffic region includes traffic modeling information. That is, FIG. 10 is a diagram illustrating a process of generating traffic modeling information.

Figure 10A:
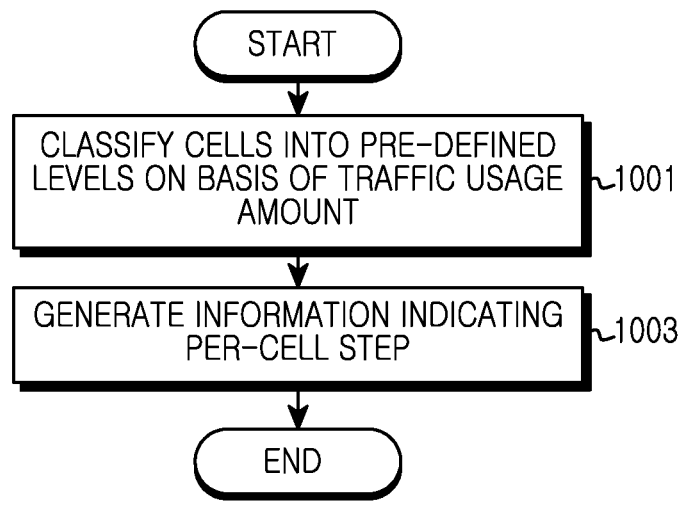
FIG. 10A is a flowchart illustrating a process of generating information for user distribution in a wireless communication system according to an embodiment of the present invention.

Referring to FIG. 10A, in Step 1001, a distribution control server classifies cells of a plurality of base stations into pre-defined levels based on a traffic usage amount. To this end, the distribution control server may store at least one threshold for the traffic usage amount. For example, the pre-defined levels include two or more levels. In Step 1003, the distribution control server generates information indicating a per-cell level.

As described above, the distribution control server is an entity for the operation of FIG. 10A. However, according to an embodiment of the present invention, the entity for the operation of FIG. 10A may be an electronic device. Alternatively, according to an embodiment of the present invention, only some of the steps of FIG. 10A may be performed by the electronic device.

Figure 10B:
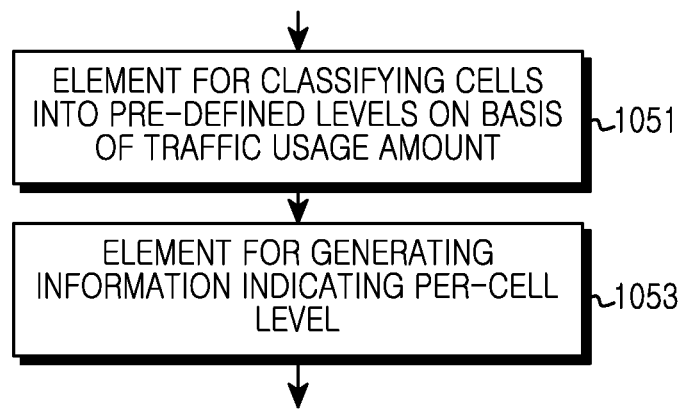
FIG. 10B is a block diagram illustrating a combination of corresponding elements for performing the process of FIG. 10A in a wireless communication system according to an embodiment of the present invention.

In order for the distribution control server or the electronic device to perform the process of FIG. 10A, the distribution control server or the electronic device includes the elements of FIG. 10B. Referring to FIG. 10B, the distribution control server or the electronic device includes an element 1051 for classifying the cells into pre-defined levels and an element 1053 for generating information indicating the per-cell level.

The method described above in relation with FIG. 10 of the present invention may be provided as one or more instructions in one or more software modules, or computer programs stored in an electronic device including a server.

FIG. 11 is a diagram illustrating a process of generating information regarding a lower-traffic region and a combination of corresponding elements in a wireless communication system according to an embodiment of the present invention. That is, FIG. 11 is a diagram illustrating a case where the information regarding the lower-traffic region includes advertisement information.

Figure 11A:
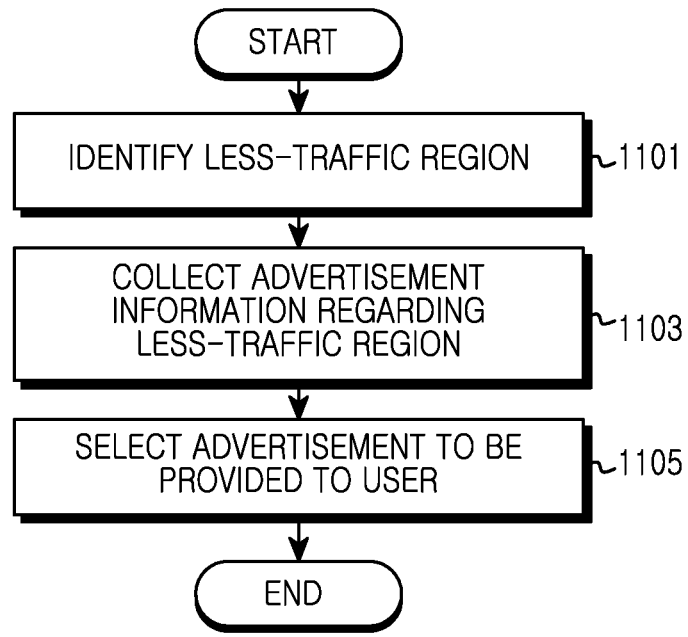
FIG. 11A is a flowchart illustrating a process of generating information for user distribution in a wireless communication system according to an embodiment of the present invention.

Referring to FIG. 11A, in Step 1101, a distribution control server identifies a lower-traffic region based on a traffic usage amount. In Step 1103, the distribution control server collects advertisement information of shops in the lower-traffic region. For example, the advertisement information includes at least one of a discount coupon, a social coupon, and a movie ticket of a shop or the like located in the lower-traffic region. To this end, the distribution control server requests an advertisement network to provide advertisement information. In this case, the distribution control server may request advertisement information only regarding the shops in the lower-traffic region, or may request whole advertisement information. In Step 1105, the distribution control server selects an advertisement to be provided to a user. In this case, the distribution control server uses user's basic information. That is, by analyzing user's basic information provided from the electronic device and information provided from the mobile communication system, the distribution control server selects at least one coupon or the like which may draw user's attention. A detailed criterion of the advertisement selection may differ depending on intentions of those who implement the present invention.

As described above, the distribution control server is an entity for the operation of FIG. 11A. However, according to an embodiment of the present invention, the entity for the operation of FIG. 11A may be an electronic device. Alternatively, according to an embodiment of the present invention, only some of the steps of FIG. 11A may be performed by the electronic device.

Figure 11B:
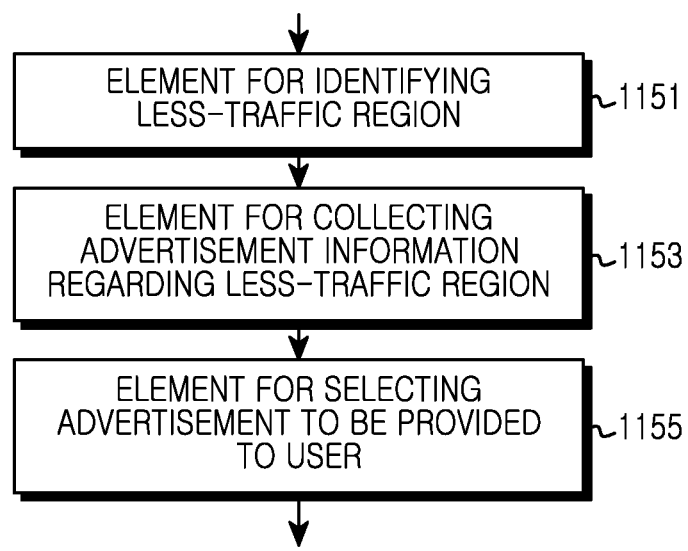
FIG. 11B is a block diagram illustrating a combination of corresponding elements for performing the process of FIG. 11A in a wireless communication system according to an embodiment of the present invention.

In order for the distribution control server or the electronic device to perform the process of FIG. 11A, the distribution control server or the electronic device includes the elements of FIG. 11B. Referring to FIG. 11B, the distribution control server or the electronic device includes an element 1151 for identifying the lower-traffic region, an element 1153 for collecting the advertisement information, and an element 1155 for selecting the advertisement.

The method described above in relation with FIG. 11 of the present invention may be provided as one or more instructions in one or more software modules, or computer programs stored in an electronic device including a server. FIG. 12 is a diagram illustrating a process of operating an electronic device and a combination of corresponding elements in a wireless communication system according to an embodiment of the present invention.

Referring to FIG. 12A, in Step 1201, the electronic device determines whether information regarding a lower-traffic region needs to be displayed. The information regarding the lower-traffic region may be displayed according to a user's instruction, or if a pre-defined specific condition is satisfied, may be performed without a user's intervention. For example, the specific condition includes whether the electronic device handovers to a high-traffic region. In addition, the specific condition includes whether a traffic load of a serving cell of the electronic device exceeds a predetermined threshold.

If it is determined that the information regarding the lower-traffic region needs to be displayed, in Step 1203, the electronic device requests the distribution control server to provide the information regarding the lower-traffic region. According to an embodiment of the present invention, the information regarding the lower-traffic region includes traffic modeling information which indicates a per-cell traffic usage amount corresponding to a usage level. Alternatively, the information regarding the lower-traffic region may be advertisement information that can be used in a shop in the lower-traffic region. For example, if the information regarding the lower-traffic region is the advertisement information, user's basic information required to select an advertisement to be provided may be transmitted together with the request. For example, the user's basic information includes at least one of a gender, an age group, a per-service frequency of usage, whether in a car, a data usage amount, and a coupon usage history.

In Step 1205, the electronic device receives the information regarding the lower-traffic region from the distribution control server. If the traffic load of the serving cell is significantly high and thus the traffic status information or the like cannot be received, the information regarding the lower-traffic region may deliver the information through an additional channel other than a typical traffic channel. For example, the additional channel includes an SMS channel, a telephone network, a channel assigned as an emergency contact network, etc.

In Step 1207, the electronic device generates a screen for showing the information regarding the lower-traffic region. For example, the screen includes at least one of an advertisement of a shop in the lower-traffic region, an indicator for indicating a per-cell traffic usage amount corresponding to a usage level, and a notice for recommending a medium change. Further, if the advertisement of the shop is included in the screen, the screen may further include at least one of an electronic map, a cell coverage, a current location of the electronic device, a location of a shop capable of using the advertisement, and a per-cell traffic usage amount. Alternatively, if the indicator for indicating the per-cell traffic usage amount corresponding to a usage level is included in the screen, the screen may further include an image to be input to a camera, an electronic map, a cell coverage, a current location of the electronic device, and a per-cell traffic usage amount. If the notice for recommending the medium change is included in the screen, the screen may further include information for indicating a medium to be changed.

After generating the screen, in Step 1209, the electronic device displays the screen such that a user can recognize the information regarding the lower-traffic region. For one example, if the information regarding the lower-traffic region includes the traffic modeling information, the electronic device displays the screen of FIG. 1A or FIG. 1B. In this case, the traffic status may be represented by using at least one of a color, a text, a number, and a figure. For another example, if the information regarding the lower-traffic region includes the advertisement information, the electronic device displays the screen of FIG. 2A or FIG. 2B.

In order for the electronic device to perform the process of FIG. 12A, the electronic device includes the elements of FIG. 12B. Referring to FIG. 12B, the electronic device includes an element 1251 for determining whether to display the information regarding the lower-traffic region, an element 1253 for requesting the information regarding the lower-traffic region, an element 1255 for receiving the information regarding the lower-traffic region, an element 1257 for generating the screen for showing the information regarding the lower-traffic region, and an element 1259 for displaying the screen.

FIG. 12 is a diagram illustrating a case in which whether to display the information regarding the lower-traffic region is determined by the electronic device. However, according to an embodiment of the present invention, whether to display the information may be determined by a network, for example, a base station or a distribution control server, instead of the electronic device. In this case, only a vendor recognizes a traffic overload, and a user is guided to the lower-traffic region while the traffic overload is not exposed to the user.

The method described above in relation with FIG. 12 of the present invention may be provided as one or more instructions in one or more software modules, or computer programs stored in an electronic device including a server.

FIG. 13 is a diagram illustrating a process of operating an electronic device and a combination of corresponding elements in a wireless communication system according to an embodiment of the present invention.

Figure 13A:
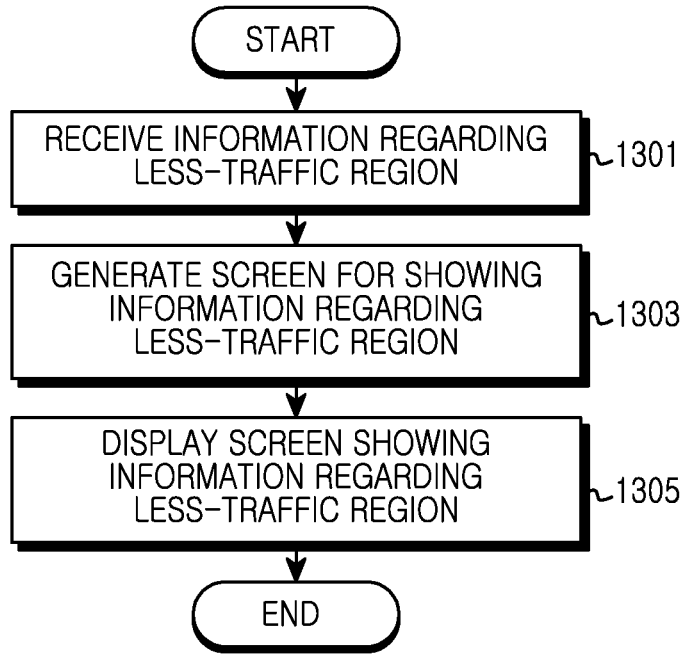
FIG. 13A is a flowchart illustrating a process of operating an electronic device in a wireless communication system according to an embodiment of the present invention.

Referring to FIG. 13A, in Step 1301, the electronic device receives the information regarding the lower-traffic region from the distribution control server. If the traffic load of the serving cell is significantly high and thus the traffic status information or the like cannot be received, the information regarding the lower-traffic region may deliver the information through an additional channel other than a typical traffic channel. For example, the additional channel includes an SMS channel, a telephone network, a channel assigned as an emergency contact network, etc.

In Step 1303, the electronic device generates a screen for showing the information regarding the lower-traffic region. For example, the screen includes at least one of an advertisement of a shop in the lower-traffic region, an indicator for indicating a per-cell traffic usage amount corresponding to a usage level, and a notice for recommending a medium change. Further, if the advertisement of the shop is included in the screen, the screen may further include at least one of an electronic map, a cell coverage, a current location of the electronic device, a location of a shop capable of using the advertisement, and a per-cell traffic usage amount. Alternatively, if the indicator for indicating the per-cell traffic usage amount corresponding to a usage level is included in the screen, the screen may further include an image to be input to a camera, an electronic map, a cell coverage, a current location of the electronic device, and a per-cell traffic usage amount. If the notice for recommending the medium change is included in the screen, the screen may further include information for indicating a medium to be changed.

After generating the screen, in Step 1305, the electronic device displays the screen such that a user can recognize the information regarding the lower-traffic region. For one example, if the information regarding the lower-traffic region includes the traffic modeling information, the electronic device displays the screen of FIG. 1A or FIG. 1B. In this case, the traffic status may be represented by using at least one of a color, a text, a number, and a figure. For another example, if the information regarding the lower-traffic region includes the advertisement information, the electronic device displays the screen of FIG. 2A or FIG. 2B.

Figure 13B:
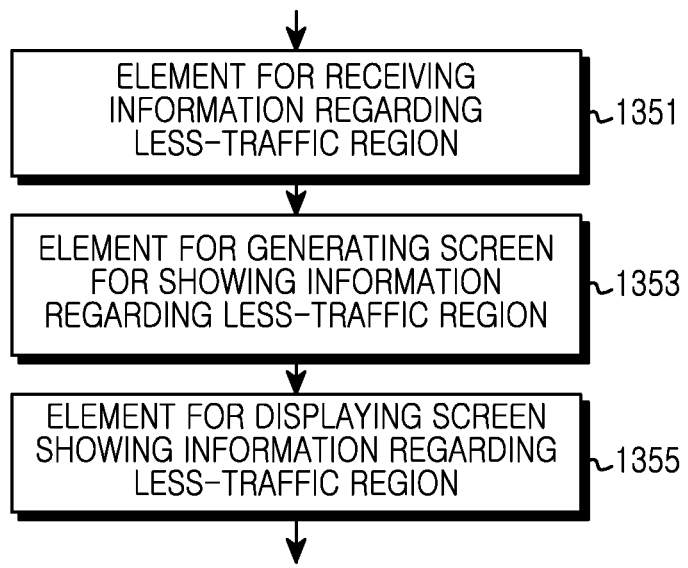
FIG. 13B is a block diagram illustrating a combination of corresponding elements for performing the process of FIG. 13A in a wireless communication system according to an embodiment of the present invention.

In order for the electronic device to perform the process of FIG. 13A, the electronic device includes the elements of FIG. 13B. Referring to FIG. 13B, the electronic device includes an element 1351 for receiving the information regarding the lower-traffic region, an element 1353 for generating the screen for showing the information regarding the lower-traffic region, and an element 1355 for displaying the screen.

The method described above in relation with FIG. 13 of the present invention may be provided as one or more instructions in one or more software modules, or computer programs stored in an electronic device including a portable terminal.

Figure 14:
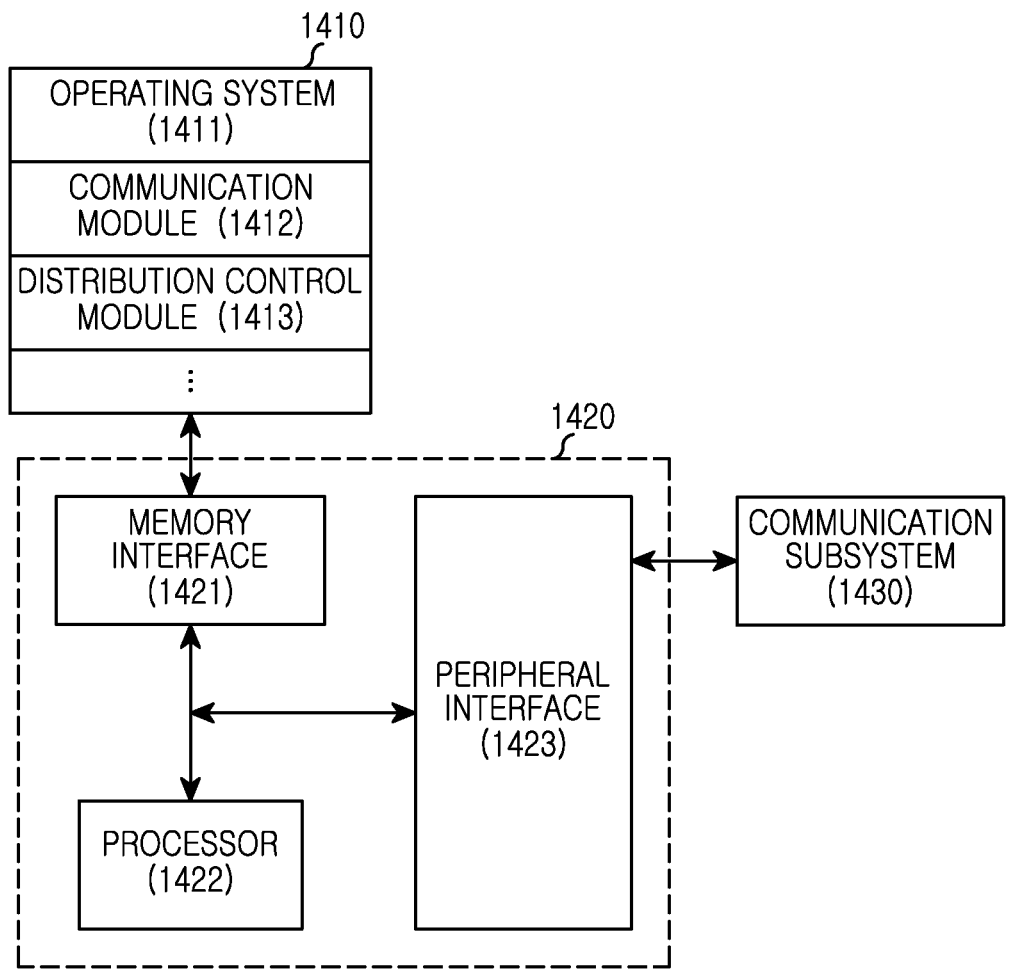
FIG. 14 is a block diagram of a distribution control server in a wireless communication system according to an embodiment of the present invention.

FIG. 14 is a block diagram of a distribution control server in a wireless communication system according to an embodiment of the present invention.

Referring to FIG. 14, the distribution control server includes a memory 1410, a processor unit 1420, and a communication subsystem 1430.

The memory 1410 may be configured with a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette, or may be configured in combination of all or some of these storage media. The configured memory may be plural in number. Further, the memory 1410 may be an attachable storage device capable of accessing the electronic device through a communication network such as the Internet, an Intranet, a Local Area Network (LAN), a Wide LAN (WLAN), a Storage Area Network (SAN), or a communication network configured by combining the networks.

The memory 1410 stores software components. The software component includes an operating system 1411, a communication module 1412, and a distribution control module 1413. Herein, a software module may be referred to as an instruction set. The operating system 1411 includes several software components for controlling a general system operation. For example, the operating system 1411 may be an embedded operating system such as WINDOWS, LINUX, Darwin, RTXC, UNIX, OS X, or VxWorks. The communication module 1412 includes several software elements for processing data transmitted and received by using the communication subsystem 1430.

The distribution control module 1413 includes software components designed to induce user distribution. For example, the distribution control module 1413 includes instructions for performing the process of FIG. 8, FIG. 10, and FIG. 11. More specifically, the distribution control module 1413 includes an instruction for analyzing a per-cell traffic status, an instruction for generating information regarding a lower-traffic region according to the per-cell traffic status, and an instruction for providing the information regarding a lower-traffic region to the electronic device. Further, the distribution control module 1413 may further include an instruction for classifying cells into pre-defined levels based on a per-cell traffic usage amount. Furthermore, the distribution control module 1413 may further include an instruction for identifying a lower-traffic region based on the per-cell traffic usage amount and an instruction for collecting advertisement information of shops in the lower-traffic region. The distribution control module 1413 may further include an instruction for selecting at least one advertisement to be provided to the electronic device among the advertisement information based on basic information on a user of the electronic device.

The processor unit 1420 includes a memory interface 1421, one or more processors 1422, and a peripheral interface 1423. All parts of the processor unit 1420 may be called a 'processor'. Some or all of the memory interface 1421, the processor 1422, and the peripheral interface 1423 may be configured as separate components or one integrated circuit. The memory interface 1421 processes data exchange between the memory 1410 and the processor 1422. The peripheral interface 1423 processes data exchanged between a peripheral device such as the communication subsystem 1430 or the like and the processor 1422. The processor 1422 executes several software programs to perform functions for the distribution control server. Further, in addition to such a typical function, the processor 1422 executes a specific software module or instruction set stored in the memory 1410 to perform a specific function corresponding to the module. In particular, the processor 1422 may execute the distribution control module 1413 stored in the memory 1410 to perform functions for user distribution according to an embodiment of the present invention.

The communication subsystem 1430 is used to perform a communication function. That is, the communication subsystem 1430 converts data transmitted from the distribution control server into a physical data, and restores the data from the physical signal received from the physical signal. The communication subsystem 1430 provides an interface for wired communication or wireless communication.

In the structure of the distribution control server described above with reference to FIG. 14, the processor 1422 executes the distribution control module 1413 stored in the memory 1410 to perform a user distribution scheme according to an embodiment of the present invention. However, according to an embodiment of the present invention, the distribution control module 1413 may be configured as a hardware module. In this case, the processor unit 1420 may further include a distribution controller. The distribution controller may be implemented as a part of the processor 1422.

Figure 15:
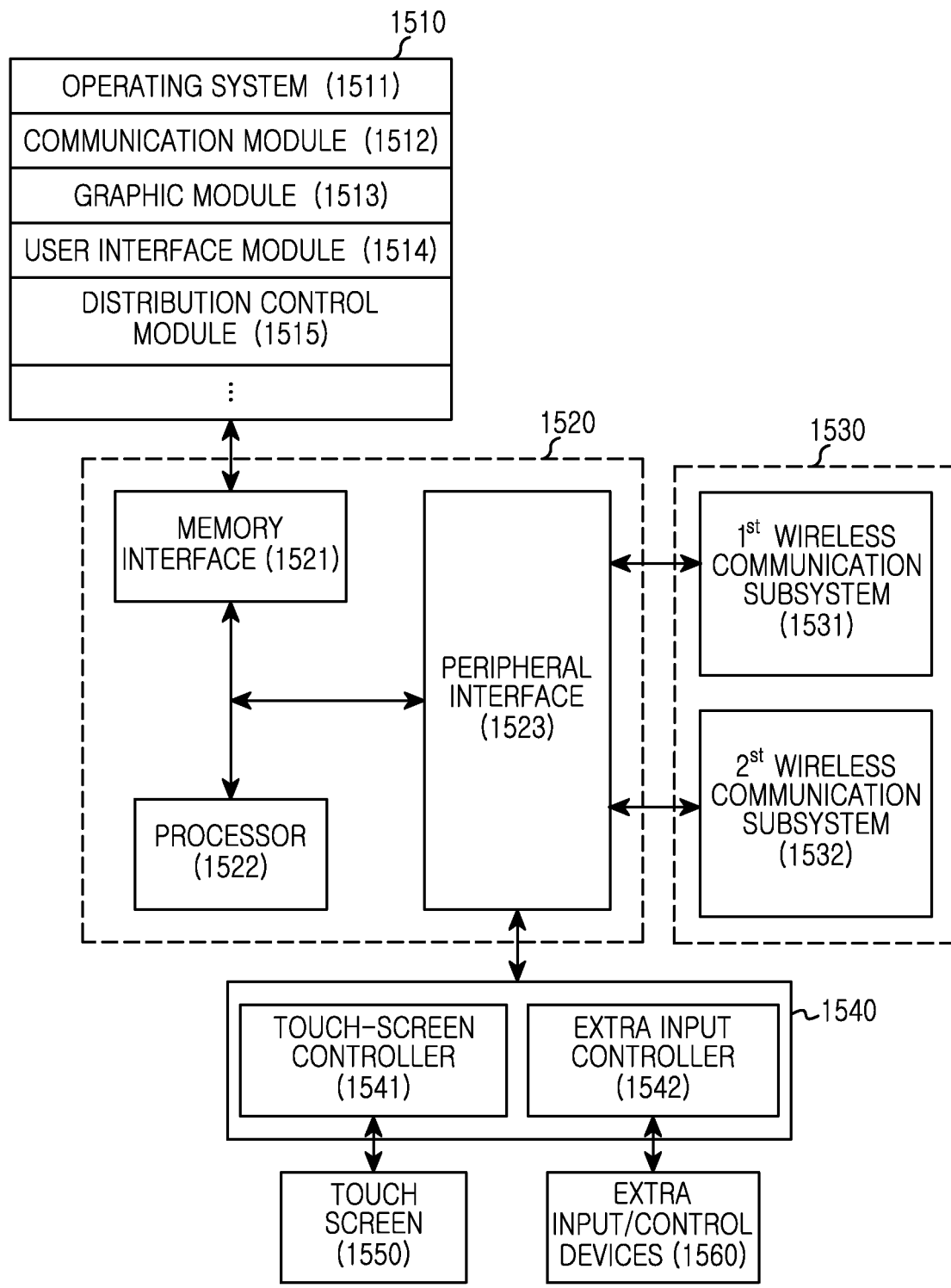
FIG. 15 is a block diagram of an electronic device in a wireless communication system according to an embodiment of the present invention.

FIG. 15 is a block diagram of an electronic device in a wireless communication system according to an embodiment of the present invention. The electronic device of FIG. 15 may be a portable electronic device, or may be one of a portable terminal, a mobile phone, a mobile pad, a media player, a tablet computer, a handheld computer, and a Personal Digital Assistant (PDA). Further, the electronic device may be an electronic device including a device which combines two or more functions of the above-described devices.

Referring to FIG. 15, the electronic device includes a memory 1510, a processor unit 1520, a communication unit 1530, an Input Output (IO) system 1540, a touch screen 1550, and an extra input or control device 1560.

The memory 1510 may be configured with a random access memory, a non-volatile memory including a flash memory, a ROM, an EEPROM, a magnetic disc storage device, a CD-ROM, DVDs or other forms of optical storage devices, and a magnetic cassette, or may be configured in combination of all or some of these storage media. The configured memory may be plural in number. Further, the memory 1510 may be an attachable storage device capable of accessing the electronic device through a communication network such as the Internet, an Intranet, a LAN, a WLAN, a SAN, or a communication network configured by combining the networks.

The memory 1510 stores software components. The software component includes an operating system 1511, a communication module 1512, a graphic module 1513, a user interface module 1514, and a distribution control module 1515. Herein, a software module may be referred to as an instruction set. The operating system 1511 includes several software components for controlling a general system operation. For example, the operating system 1511 may be an embedded operating system such as WINDOWS, LINUX, Darwin, RTXC, UNIX, OS X, or VxWorks. The communication module 1512 includes several software elements for processing data transmitted and received by using the communication unit 1530. The graphic module 1513 includes several software components for providing and displaying a graphic on the touch screen 1550. In concept, the term 'graphic' includes a text, a web page, an icon, a digital image, a video, an animation, etc. The user interface module 1514 includes several software components related to a user interface.

The distribution control module 1515 includes software components designed to induce user distribution. For example, the distribution control module 1515 includes instructions for performing the process of FIG. 12 or FIG. 13. More specifically, the distribution control module 1515 includes an instruction for generating a screen which induces a user to move to a lower-traffic region and an instruction for displaying the screen by using a display element. Further, the distribution control module 1515 may further include an instruction for requesting a server to provide the information regarding the lower-traffic region and an instruction for receiving the information regarding the lower-traffic region from the server. The distribution control module 1515 may further include an instruction for classifying cells into pre-defined levels based on a per-cell traffic usage amount. The distribution control module 1515 may further include an instruction for identifying a lower-traffic region based on the per-cell traffic usage amount and an instruction for collecting advertisement information of shops in the lower-traffic region.

The processor unit 1520 includes a memory interface 1521, one or more processors 1522, and a peripheral interface 1523. All parts of the processor unit 1520 may be called a 'processor'. Some or all of the memory interface 1521, the processor 1522, and the peripheral interface 1523 may be configured as separate components or one integrated circuit. The memory interface 1521 processes data exchange between the memory 1510 and the processor 1522. The peripheral interface 1523 processes data exchanged between a peripheral device such as the communication unit 1530 or the like and the processor 1522. The processor 1522 executes several software programs to perform functions for the distribution control server. Further, in addition to such a typical function, the processor 1522 executes a specific software module or instruction set stored in the memory 1510 to perform a specific function corresponding to the module. In particular, the processor 1522 may execute the distribution control module 1513 stored in the memory 1510 to perform functions for user distribution according to an embodiment of the present invention.

The communication unit 1530 provides an interface for performing communication. The communication unit 1530 includes a $1^{st}$ wireless communication subsystem 1531 and a $2^{nd}$ wireless communication subsystem 1532. The wireless communication subsystems 1531 and 1532 include a radio frequency receiver and transceiver and/or an optical (e.g., infrared ray) receiver and transceiver. The $1^{st}$ wireless communication subsystem 1531 and the $2^{nd}$ wireless communication subsystem 1532 may be identified depending on a supported communication network. For example, the communication network may be one of a Global System for Mobile Communication (SM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network and/or a Bluetooth network. The $1^{st}$ wireless communication subsystem 1531 and the $2^{nd}$ wireless communication subsystem 1532 may be configured as one block.

The input/output subsystem 1540 includes a touch-screen controller 1541 and/or an extra input controller 1542. The touch-screen controller 1541 is coupled to a touch screen 1550. The touch screen 1550 and the touch-screen controller 1541 may use not only capacitance, resistance, infrared and surface sound wave techniques for determining one or more contact points but also any multi-touch sense technique including other proximity sensor arrays or other elements to detect a contact and movement or stopping thereof. The extra input controller 1542 may be coupled to extra input/control devices 1560.

The touch screen 1550 provides an input/output interface between the electronic device and a user. That is, the touch screen 1550 delivers a touch input of the user to the electronic device. Further, the touch screen 1550 is a medium for showing to the user an output from the electronic device. That is, the touch screen 1550 shows a visual output to the user. Such a visual output is represented in a form of a text, a graphic, a video, and a combination thereof. A variety of displays can be used as the touch screen 1550. For example, the touch screen 1550 includes a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED). A touch sensitive display, called as the touch screen 1550, may be used as the display unit. In this situation, a touch input may be performed via the touch sensitive display.

The extra input/control devices 1560 include various types of input elements. For example, the extra input/control devices 1560 include one or more up/down buttons for volume control. The button may be one of a push button and a rocker button. Further, the extra input/control devices 1560 include a point device such as a rocker switch, a thumbwheel, a dial, a stick, a stylus, etc.

In the structure of the distribution control server described above with reference to FIG. 15, the processor 1522 executes the distribution control module 1515 stored in the memory 1510 to perform a user distribution scheme according to an embodiment of the present invention. However, according to an embodiment of the present invention, the distribution control module 1515 may be implemented as a hardware module. In this case, the processor unit 1520 may further include a distribution controller. The distribution controller may be implemented as a part of the processor 1522.

The present invention may be implemented in an electronic device including a portable terminal such as, for example, a smart phone and a mobile telecommunication terminal. Herein, a portable terminal is used as an example of the electronic device.

Embodiments of the present invention, as well as all of the functional operations thereof described in this specification may be implemented in computer software, firmware, or hardware, including the structures disclosed in this specification and their structural equivalents, or in combinations of one or more of them. Further, the embodiments of the present invention described in this specification may be executed by one or more computer program products, i.e., an electronic device, a data processing device, etc., or may be implemented in one or more modules of computer program instructions encoded on a non-transitory computer readable medium for controlling an operation of these devices.

The computer readable medium may be a machine-readable storage medium, a machine-readable storage substrate, a memory device, a composition of matter effecting a machine-readable propagated stream, or a combination of one or more of them. The term "data processing device" includes, for example, a programmable processor, a computer, or multiple processors or all apparatus, devices, and machines for processing data, including the computer. The apparatus includes, in addition to hardware, code that generates an execution environment for the computer program, e.g., code that constitutes processor firmware, a protocol stack, a database management system, an operating system, or a combination of one or more of them.

The propagated stream is an artificially generated stream, e.g., a machine-generated electrical, optical, or electromagnetic stream that is generated to encode information for transmission to suitable receiver devices. The computer program (also known as a program, software, software application, script, or code) may be written in any form of programming languages, including compiled or interpreted languages, and it may be deployed in any form, including as a stand alone program or as a module, component, subroutine, or other unit suitable for use in a computing environment. The computer program does not necessarily correspond to a file in a file system. The program may be stored in a portion of a file that holds other programs or data (e.g., one or more scripts stored in a markup language document), in a single file dedicated to the program, or in multiple coordinated files (e.g., files that store one or more modules, sub programs, or portions of code).

The computer program may be deployed to be executed on one computer or on multiple computers that are located at one site or distributed across multiple sites and interconnected by a communication network. The processes and logic flows described in this specification may be performed by one or more programmable processors executing one or more computer programs which perform functions by operating input data and generating an output thereof. The processes and logic flows may be performed by a special purpose logic circuitry, e.g., a Field Programmable Gate Array (FPGA) or an Application-Specific Integrated Circuit (ASIC). The device may be implemented as the special purpose logic circuitry.

According to an aspect of the present invention, overall system efficiency is increased by distributing users in a wireless communication system.

While the present invention has been shown and described with reference to various embodiments thereof, it will be understood by those skilled in the art that various changes in form and details may be made therein without departing from the spirit and scope of the present invention as defined by the appended claims.

What is claimed is:

1. A method for operating a mobile electronic device in a wireless communication system, the method comprising: generating a screen for showing information regarding a lower-traffic region according to a per-cell traffic status; and displaying the screen by using a display element, wherein the screen comprises an advertisement of a shop in the lower-traffic region for inducing a user of the mobile electronic device to move to the lower-traffic region, and wherein the lower-traffic region comprises at least one cell that has a relatively low traffic amount while communicating wirelessly and that provides a performance of wireless communication.

2. The method of claim 1, wherein, if the advertisement of the shop is included in the screen, the screen further comprises at least one of an electronic map, a cell coverage, a current location of the terminal, a location of a shop capable of using the advertisement, and a per-cell traffic usage amount.

3. The method of claim 1, wherein the screen further comprises an indicator for indicating a per-cell traffic usage amount corresponding to a usage level, and
wherein, if the indicator for indicating the per-cell traffic usage amount corresponding to the usage level is included in the screen, the screen further comprises an image to be input to a camera, an electronic map, a cell coverage, a current location of the terminal, and a per-cell traffic usage amount.

4. The method of claim 1, wherein the screen further comprises a notice for recommending a medium change, and
wherein, if the notice for recommending the medium change is included in the screen, the screen further comprises information for indicating a medium to be changed.

5. The method of claim 1, further comprising receiving the information regarding the lower-traffic region.

6. The method of claim 1, further comprising:
collecting information on a per-cell traffic status; and
classifying cells into pre-defined levels based on the per-cell traffic status.

7. The method of claim 1, further comprising:
collecting information on a per-cell traffic status;
identifying the lower-traffic region based on the per-cell traffic status; and
collecting advertisement information of shops in the lower-traffic region.

8. A method for operating a server in a wireless communication system, the method comprising: collecting information on a per-cell traffic status; generating information regarding a lower-traffic region according to the per-cell traffic status; and providing the information regarding the lower-traffic region to a mobile electronic device to be displayed in a screen using a display element, wherein the information regarding the lower-traffic region comprises an advertisement of a shop in the lower-traffic region for inducing a user of the mobile electronic device to move to the lower-traffic region, and wherein the lower-traffic region comprises at least one cell that has a relatively low traffic amount while communicating wirelessly and that provides a performance of wireless communication.

9. The method of claim 8, further comprising determining whether to provide the information regarding the lower-traffic region to the terminal according to whether a pre-defined condition is satisfied, wherein the pre-defined condition includes at least one of whether the terminal handovers to a high-traffic region and whether a traffic load of a serving cell of the terminal exceeds a predetermined threshold.

10. The method of claim 8, wherein generating the information regarding the lower-traffic region comprises:
identifying the lower-traffic region according to the traffic status information; and
collecting advertisement information of shops in the lower-traffic region.

11. The method of claim 8, wherein generating the information regarding the lower-traffic region comprises classifying cells into pre-defined levels according to the traffic status information.

12. A mobile electronic device apparatus in a wireless communication system, the apparatus comprising: at least one processor; a display element; and a memory configured to store a module executed by the at least one processor, wherein the module includes at least one instruction which generates a screen for showing information regarding a lower-traffic region according to a per-cell traffic status and which displays the screen by using the display element, wherein the screen comprises an advertisement of a shop in the lower-traffic region for inducing a user of the mobile electronic device to move to the lower-traffic region, and wherein the lower-traffic region comprises at least one cell that has a relatively low traffic amount while communicating wirelessly and that provides a performance of wireless communication.

13. The apparatus of claim 12, wherein, if the advertisement of the shop is included in the screen, the screen further comprises at least one of an electronic map, a cell coverage, a current location of the terminal, a location of a shop capable of using the advertisement, and a per-cell traffic usage amount.

14. The apparatus of claim 12, wherein the screen further comprises an indicator for indicating a per-cell traffic usage amount corresponding to a usage level, and
wherein, if the indicator for indicating the per-cell traffic usage amount corresponding to the usage level is included in the screen, the screen further comprises an image to be input to a camera, an electronic map, a cell coverage, a current location of the terminal, and a per-cell traffic usage amount.

15. The apparatus of claim 12, wherein the screen further comprises a notice for recommending a medium change, and
wherein, if the notice for recommending the medium change is included in the screen, the screen further comprises information for indicating a medium to be changed.

16. The apparatus of claim 12, further comprising a communication unit for providing an interface for performing communication, wherein the module further comprises an instruction for receiving the information regarding the lower-traffic region.

17. The apparatus of claim 12, wherein the module further comprises an instruction for collecting information on a per-cell traffic status and for classifying cells into pre-defined levels based on the per-cell traffic status.

18. The apparatus of claim 12, wherein the module further comprises an instruction for collecting information on a per-cell traffic status, for identifying the lower-traffic region based on the per-cell traffic status, and for collecting advertisement information of shops in the lower-traffic region.

19. A server apparatus in a wireless communication system, the apparatus comprising: at least one processor; a memory configured to store a module executed by the at least one processor; and a communication subsystem configured to provide an interface to perform communication, wherein the module comprises at least one instruction for collecting information on a per-cell traffic status, generating information regarding a lower traffic region according to the per-cell traffic status, and providing the information regarding the lower-traffic region to a mobile electronic device to be displayed in a screen using a display element, wherein the information regarding the lower-traffic region includes an advertisement of a shop in the lower-traffic region for inducing a user of the mobile electronic device to move to the lower-traffic region, and wherein the lower-traffic region comprises at least one cell that has a relatively low traffic amount while communicating wirelessly and that provides a performance of wireless communication.

20. The apparatus of claim 19, wherein the module further comprises an instruction for determining whether to provide the information regarding the lower-traffic region to the terminal according to whether a pre-defined condition is satisfied, wherein the pre-defined condition comprises at least one of whether the terminal handovers to a high-traffic region and whether a traffic load of a serving cell of the terminal exceeds a predetermined threshold.

21. The apparatus of claim 19, wherein, in order to generate the information regarding the lower-traffic region, the module further comprises an instruction for identifying the lower-traffic region according to the traffic status information and for collecting advertisement information of shops in the lower traffic region.

22. A non-transitory computer-readable storage medium for storing one or more programs, performed by a mobile electronic device, the one or more programs including instructions which allow the device to perform a method for operating the mobile electronic device in a wireless communication system, the method comprising: generating a screen for showing information regarding a lower-traffic region according to a per-cell traffic status; and displaying the generated screen by using a display element, wherein the generated screen includes at least one of an advertisement of a shop in the lower-traffic region for inducing a user of the mobile electronic device to move to the lower-traffic region, and wherein the lower-traffic region comprises at least one cell that has a relatively low traffic amount while communicating wirelessly and that provides a performance of wireless communication.

* * * * *